(12) United States Patent
Kramer

(10) Patent No.: US 7,788,188 B2
(45) Date of Patent: *Aug. 31, 2010

(54) SYSTEM FOR PROVIDING A SERVICE TO VENUES WHERE PEOPLE AGGREGATE

(75) Inventor: James Frederick Kramer, Redwood City, CA (US)

(73) Assignee: Hoozware, Inc., Foster City, CA (US)

( * ) Notice: Subject to any disclaimer, the term of this patent is extended or adjusted under 35 U.S.C. 154(b) by 1174 days.

This patent is subject to a terminal disclaimer.

(21) Appl. No.: 11/307,262

(22) Filed: Jan. 30, 2006

(65) Prior Publication Data

US 2007/0179792 A1 Aug. 2, 2007

(51) Int. Cl.
*G06Q 99/00* (2006.01)
(52) U.S. Cl. .................................... 705/319; 705/14.58
(58) Field of Classification Search .............. 705/14.58, 705/319
See application file for complete search history.

(56) References Cited

U.S. PATENT DOCUMENTS

| | | |
|---|---|---|
| 6,259,405 B1 | 7/2001 | Stewart et al. |
| 6,414,635 B1 | 7/2002 | Stewart et al. |
| 6,480,885 B1 | 11/2002 | Olivier |
| 6,549,768 B1 | 4/2003 | Fraccaroli |
| 6,571,279 B1 | 5/2003 | Herz et al. |
| 6,618,593 B1 | 9/2003 | Drutman et al. |
| 6,731,940 B1 | 5/2004 | Nagendran |
| 6,819,919 B1 | 11/2004 | Tanaka |
| 6,834,195 B2 | 12/2004 | Brandenberg et al. |
| 6,848,542 B2 | 2/2005 | Gailey et al. |
| 6,934,684 B2 | 8/2005 | Alpdemir et al. |
| 6,944,447 B2 | 9/2005 | Portman et al. |
| 2001/0042002 A1 | 11/2001 | Koopersmith |
| 2001/0043232 A1 | 11/2001 | Abbott et al. |
| 2001/0051973 A1 | 12/2001 | Green et al. |
| 2002/0010584 A1 | 1/2002 | Schultz et al. |

(Continued)

FOREIGN PATENT DOCUMENTS

WO WO0201405 A1 1/2002

OTHER PUBLICATIONS

LBS Startups to Watch: A slew of location-based services startups are hoping to make serendipity a little more regular, Red Herring Magazine, Oct. 17, 2005 Print Issue (scan of 5-page printout submitted).

(Continued)

*Primary Examiner*—Jonathan Ouellette

(57) ABSTRACT

A system and method for providing a service to promoters, including venues and advertising sponsors, who wish to provide promotions. The service includes making promoter promotions accessible by the mobile phones of members associated with an organization. Typically a promotion and member are matched based on the member's geographical position, as determined automatically by a position sensor in their mobile phone, and by the member's traits and behaviors. By accepting a promotion, a member receives reward points which can be used to obtain goods and services. In addition to accessing promotions, members have mobile access to real-time information about the venues, such as the demographics of venue attendees and media posted by attendees concerning venue characteristics. Using the system, members can determine before going to a venue, such as a nightclub or bar, which venue has their preferred attendee demographic, atmosphere, music, cover charge, drink specials, friends, etc.

51 Claims, 7 Drawing Sheets

U.S. PATENT DOCUMENTS

| | | | |
|---|---|---|---|
| 2002/0013815 A1 | 1/2002 | Obradovich et al. | |
| 2002/0022488 A1 | 2/2002 | Srinivasan et al. | |
| 2002/0034292 A1 | 3/2002 | Tuoriniemi et al. | |
| 2002/0047861 A1 | 4/2002 | LaBrie et al. | |
| 2002/0068585 A1 | 6/2002 | Chan et al. | |
| 2002/0087525 A1 | 7/2002 | Abbott et al. | |
| 2002/0111164 A1* | 8/2002 | Ritter | 455/426 |
| 2002/0116461 A1 | 8/2002 | Diacakis | |
| 2002/0120774 A1 | 8/2002 | Diacakis | |
| 2002/0123934 A1 | 9/2002 | Tanaka et al. | |
| 2002/0138325 A1 | 9/2002 | Mashimo et al. | |
| 2002/0151315 A1 | 10/2002 | Hendry | |
| 2002/0160766 A1 | 10/2002 | Portman et al. | |
| 2002/0161657 A1 | 10/2002 | Kojac et al. | |
| 2002/0184653 A1 | 12/2002 | Pierce et al. | |
| 2003/0014275 A1 | 1/2003 | Bearden, III et al. | |
| 2003/0060214 A1 | 3/2003 | Hendrey et al. | |
| 2003/0073406 A1 | 4/2003 | Benjamin et al. | |
| 2003/0115288 A1 | 6/2003 | Ljubicich et al. | |
| 2003/0117432 A1 | 6/2003 | Kautto-Kiovula et al. | |
| 2003/0220835 A1 | 11/2003 | Barnes, Jr. | |
| 2003/0233278 A1 | 12/2003 | Marshall | |
| 2003/0233332 A1 | 12/2003 | Keeler et al. | |
| 2004/0006478 A1 | 1/2004 | Alpdemir et al. | |
| 2004/0006548 A1 | 1/2004 | Mahmood | |
| 2004/0010608 A1 | 1/2004 | Piccionelli et al. | |
| 2004/0015562 A1 | 1/2004 | Harper et al. | |
| 2004/0024846 A1 | 2/2004 | Randall et al. | |
| 2004/0081120 A1 | 4/2004 | Chaskar | |
| 2004/0088551 A1 | 5/2004 | Dor et al. | |
| 2004/0107283 A1 | 6/2004 | Paddon | |
| 2004/0122810 A1 | 6/2004 | Mayer | |
| 2004/0133480 A1* | 7/2004 | Domes | 705/26 |
| 2004/0137882 A1 | 7/2004 | Forsyth | |
| 2004/0148638 A1 | 7/2004 | Weisman et al. | |
| 2004/0203363 A1 | 10/2004 | Carlton et al. | |
| 2004/0203746 A1 | 10/2004 | Knauerhase et al. | |
| 2004/0215793 A1 | 10/2004 | Ryan et al. | |
| 2004/0220922 A1 | 11/2004 | Lovison et al. | |
| 2004/0224703 A1* | 11/2004 | Takaki et al. | 455/457 |
| 2004/0249846 A1 | 12/2004 | Randall et al. | |
| 2004/0266480 A1 | 12/2004 | Hjelt et al. | |
| 2005/0003759 A1 | 1/2005 | Alley | |
| 2005/0038876 A1 | 2/2005 | Chaudhuri | |
| 2005/0043060 A1 | 2/2005 | Brandenberg et al. | |
| 2005/0054352 A1 | 3/2005 | Karaizman | |
| 2005/0076078 A1 | 4/2005 | Salton | |
| 2005/0078088 A1 | 4/2005 | Davis et al. | |
| 2005/0102180 A1 | 5/2005 | Gailey et al. | |
| 2005/0130634 A1 | 6/2005 | Godfrey | |
| 2005/0132305 A1 | 6/2005 | Guichard et al. | |
| 2005/0135305 A1 | 6/2005 | Wentink | |
| 2005/0136949 A1 | 6/2005 | Barnes, Jr. | |
| 2005/0169446 A1 | 8/2005 | Randall et al. | |
| 2005/0174975 A1 | 8/2005 | Mgrdechian et al. | |
| 2005/0177614 A1 | 8/2005 | Bourne | |
| 2005/0181803 A1 | 8/2005 | Weaver et al. | |
| 2005/0193054 A1 | 9/2005 | Wilson et al. | |
| 2005/0202817 A1 | 9/2005 | Sudit | |
| 2005/0210387 A1 | 9/2005 | Alagappan et al. | |
| 2005/0227676 A1 | 10/2005 | De Vries | |
| 2005/0228719 A1* | 10/2005 | Roberts et al. | 705/14 |
| 2006/0217135 A1* | 9/2006 | Moore et al. | 455/466 |
| 2007/0030824 A1* | 2/2007 | Ribaudo et al. | 370/328 |
| 2007/0071208 A1* | 3/2007 | Morris | 379/201.02 |
| 2007/0112762 A1* | 5/2007 | Brubaker | 707/5 |
| 2008/0255939 A1* | 10/2008 | Harmon et al. | 705/14 |
| 2009/0070230 A1* | 3/2009 | Silverstein et al. | 705/26 |
| 2009/0254971 A1* | 10/2009 | Herz et al. | 726/1 |

OTHER PUBLICATIONS

Michel Marriott, With GPS, getting around gets easier, C|Net, www.news.com/With+GPS%2C+getting+around+gets+easier/2100-1041_3-5998828.html (scan of 4-page printout submitted).

Mobido website, www.mobido.com (scan of 10-page printout submitted).

WaveMarket website, www.wavemarket.com (scan of 11-page printout submitted).

6th Sense website, www.sixsense.com (scan of 11-page printout submitted).

* cited by examiner

SYSTEM FOR PROVIDING A SERVICE TO VENUES WHERE PEOPLE AGGREGATE

TECHNICAL FIELD

The field of this invention is providing services to venues.

BACKGROUND

MoSoSo (short for "mobile social software") has become a recent phenomenon for social networking. The efforts are primarily directed to either meeting new people or providing a simplified method for keeping track of acquaintances. Various approaches are employed using individual terminology and somewhat different protocols. Some of the existing approaches are concerned with the manner of introducing people to each other.

For example, Mobido™ (www.mobido.com) collects photographs of members and can provide the photograph to another member under certain restricted circumstances. It also provides for individuals or businesses to be contacted through the use of "tags."

Wave Market promotes StreetHive™ (www.streethive.com) which provides social networking and location tagging between friends. It allows people to know where others are and to contact such people.

Dodgeball™ (www.dodgeball.com) provides another social cell phone capability, where you can communicate with groups of friends. It also provides addresses of venues.

There are a number of other groups that provide for similar services that can be found at www.zogo.com, www.meetro.com, www.plazes.com, www.bedd.com, www.smallplanet.com, www.sixsense.com, www.jambo.net, www.mobiluck.com, www.icontact.com, www.imahima.com, www.proxpro.com, www.ravewireless.com, www.intercastincorp.com and www.satelx.com.

For the most part the MoSoSo capabilities are primarily for the users of the system to allow for meeting people and locating a defined group of people. They do not concern themselves with providing opportunities for businesses to direct their communications to likely patrons. Rather, their attention is directed to the individual subscribers and looking for points of similarity between the subscribers to bring one subscriber to the attention of another.

There is substantial interest in providing venues, such as night clubs and bars, with information that allows them to attract clientele to their venue based on the demographics of people at the venue and the desired demographics that the venue wishes to achieve. By demographics is meant a statistic concerning a selected population. Methods that allow the venues to compete for desirable clientele based on reliable information about potential clientele trying to select a venue is very valuable and allows for efficient use of the venue's resources, while allowing the client to select a venue based on current information about the venue.

Relevant Literature

Hancock, John, WO 02/01405 A1, describes a people networking and locating system. Lovison et al., US 2004/0220922 A1, describes a system for meeting people via wireless communication. Randall et al., US 2004/0249846 A1, describes a database for use with a wireless information device. Randall et al., US 2004/0024846 A1, describes a method of enabling a wireless information device to access data services. Knauerhase et al., US 2004/0203746 A1, describes location-specific collaboration for mobile devices. Piccionelli et al., US 2004/001 0608 A1, describes a remote dating method. Salton, US 2005/0076078 A1, describes an event based communication system. Forsyth, US 2004/0137882 A1, describes a group communication method for a wireless communication device. Alpdemir et al., U.S. Pat. No. 6,934,684 B2, describes a voice-interactive marketplace providing promotion and promotion tracking, loyalty reward and redemption, and other features. Alpdemir et al., US 2004/0006478 A1, describes a voice-interactive marketplace providing promotion and promotion tracking, loyalty reward and redemption, and other features. Carlton et al., US 2004/0203363 A1, describes a portable communication apparatus and method for match-making with unique user ID. Hendry, US 2004/0151315 A1, describes a technique for managing and querying moving point data. LaBrie et al., US 2002/0047861 A1, describes a site information system and method. Srinivasan et al., US 2002/0022488 A1, describes a method and apparatus for time-aware and location-aware marketing. Alley, US 2005/0003759 A1, describes and anonymous communication device. Guichard et al., US 2005/0132305 A1, describes an electronic information access system, methods for creation and related commercial models. Tanaka, U.S. Pat. No. 6,819,919 B1, describes a method for providing matching and introduction services to proximate mobile users and service providers. Nagendran, U.S. Pat. No. 6,731,940 B1, describes methods of using wireless geolocation to customize content and delivery of information to wireless communication devices. Drutman et al., U.S. Pat. No. 6,618,593 B1, describes a location dependent user matching system. Hertz et al., U.S. Pat. No. 6,571,279 B1, describes a location enhanced information delivery system. Fraccaroli, U.S. Pat. No. 6,549,768 B1, describes a mobile communications matching system. Olivier, U.S. Pat. No. 6,480,885 B1, describes dynamically matching users for group communications based on a threshold degree of matching of sender and recipient predetermined acceptance criteria. Alagappan et al., US 2005/0210387 A1, describes a system and method for the aggregation and matching of information. Sudit, US 2005/0202817 A1, describes a system and method for exchange of geographic location and user profiles over a wireless network. Wilson et al., US 2005/0193054 A1, describes a multi-user social interaction network. Weaver et al., US 2005/0181803 A1, describes a system for combining geographic location information, database-derived affinity matches, and user control in order to permit individuals to rendezvous. Bourne, US 2005/0177614 A1, describes a method and computer system for matching mobile devices users for business and social networking. Mgrdechian et al., US 2005/0174975 A1, describes a system and method for wireless communication between previously known and unknown users. Karaizman, US 2005/0054352 A1, describes introduction system and method utilizing mobile communication. Brandenberg et al., US 2005/0043060 A1, describes method and apparatus for scheduling presentation of digital content on a personal communication device. Chaudhuri, US 2005/0038876 A1, describes a system and method for instant match based on location, presence, personalization and communication. Ryan et al., US 2004/0215793 A1, describes a personal contact network. Mayer, US 2004/0122810 A1, describes a system and method for searching, finding and contacting dates on the internet in instant messaging networks and/or in other methods that enable immediate finding and creating immediate contact. Paddon, US 2004/0107283 A1, describes a system and method for the aggregation and matching of personal information. Mahmood, US 2004/0006548 A1, describes a subscriber profile matching and positioning system for mobile units in a communication system. Marshall, US 2003/0233278 A1, describes a method and system for tracking and providing incentives for tasks and activities and other behavioral influences related to money, individuals, technology and other assets. Kautto-Kiovula et al., US 2003/0117432 A1, describes a method, system and apparatus for constructing fully personalized and contextualized user interfaces for terminals in mobile use. Hendrey et al., US 2003/0060214 A1, describes a system and method for initiating responses to location-based events. Bearden, III et al., US 2003/0014275 A1, describes an attendee electronic sporting event information transmitting and storage systems. Pierce et al., US 2002/0184653 A1, describes services based on position location using broadcast digital television signals. Kojac et al., US 2002/0161657 A1, describes a system for rapid identification of vehicle occupants for the purpose of facilitating mobile sales marketing, communication and safety. Chan et al., US 2002/0068585 A1, describes an intelligent mobile information system. Tuoriniemi et al., US 2002/0034292 A1, describes a system and a method to match demand and supply based on geographical location derived from a positioning system. Schultz et al., US 2002/0010584 A1, describes an interactive voice communication method and system for information and entertainment. Portman et al., U.S. Pat. No. 6,944,447 B2, describes location-based services. Gailey et al., U.S. Pat. No. 6,848,542 B2, describes a method for passive mining of usage information in a location-based services system. Brandenberg et al, U.S. Pat. No. 6,834,195 B2, describes a method and apparatus for scheduling presentation of digital content on a personal communication device. Stewart et al., U.S. Pat. No. 6,414,635 B1, describes a geographic-based communication service system with more precise determination of a user's known geographic location. Stewart et al., U.S. Pat. No. 6,259,405 B1, describes a geographic based communications service. DeVries, U.S. Pat. No. 2005/0227676 A1, describes place specific buddy list services. Randall et al., US 2005/0169446 A1, describes a method of and apparatus for communicating user related information using a wireless information device. Barnes, JR., US 2005/0136949 A1, describes a portable communications device and method of use. Wentink, US 2005/0135305 A1, describes automatic peer discovery. Godfrey, US 2005/0130634 A1, describes location awareness in wireless networks. Gailey et al., US 2005/0102180 A1, describes passive mining of usage information in a location-based services system. Davis et al., US 2005/0078088 A1, describes an enhanced input peripheral. Hjelt et al., US 2004/0266480 A1, describes a system and method for implementing sensor functionality in mobile devices. Ryan et al., US 2004/0215793 A1, describes a personal contact network. Weisman et al., US 2004/0148638 A1, describes a method and apparatus for entertainment and information services delivered via mobile telecommunications devices. Dor et al., US 2004/0088551 A1, describes identifying persons seeking access to computers and networks. Chaskar, US 2004/0081120 A1, describes a method and apparatus providing user programmable, personalized location-aware services. Harper et al., US 2004/0015562 A1, describes a method, apparatus and system for management of information content for enhanced accessibility over wireless communication networks. Keeler et al., US 2003/0233332 A1, describes a system and method for user access to a distributed network communication system using persistent identification of subscribers. Marshall, US 2003/0233278 A1, describes a method and system for tracking and providing incentives for tasks and activities and other behavioral influences related to money, individuals, technology and other assets. Barnes, JR., US 2003/0220835 A1, describes a system, method, and computer program product for providing location based services and mobile e-commerce. Ljubicich et al., US 2003/0115288 A1, describes a technique for effective management of information and communications using a mobile device. Benjamin et al., U.S. Pat. No. 2003/0073406 A1, describes multi-sensor fusion. Portman et al., US 2002/0160766 A1, describes location -based services. Mashimo, US 2002/0138325 A1, describes an event invitation method and system. Tanaka et al., US 2002/0123934 A1, describes a method and apparatus for location-sensitive, subsidized cell phone billing. Diacakis, US 2002/0120774 A1, describes a method of sending a communication from a first terminal to a second terminal via a host. Diacakis, US 2002/0116461 A1, describes a presence and availability management system. Abbott et al., US 2002/0087525 A1, describes soliciting information based on a computer user's context. Chan et al., US 2002/0068585 A1, describes an intelligent mobile information system. Obradovich et al., US 2002/0013815 A1, describes a technique for effective organization and communication of information. Green et al., US 2001/0051973 A1, describes a system, method and computer program product for a locator service. Abbott et al., US 2001/0043232 A1, describes thematic response to a computer user's context, such as by a wearable personal computer. Koopersmith, US 2001/0042002 A1, describes a method and system for communicating targeted information. An article in Red Herring Magazine, "LBS Startups to Watch: A slew of location-based services startups are hoping to make serendipity a little more regular," Oct. 17, 2005 Print Issue, online at: http://www.redherring.com/Article.aspx?a=14210&hed=LBS+Startups+to+Watch, describes companies developing mobile social software.

SUMMARY OF THE INVENTION

The subject invention provides a system for providing a service to venues where people aggregate. The service involves information concerning the traits, demographics and/or behaviors of people who attend the venues. Such information is of interest to the venues and to members, where the members are associated with an organization, such as Hoozware, for processing and transmitting information to the venues and the members. The venues have characteristics or promotional material of interest to the members. The system includes a data processor having data comprising demographics of people. Typically, the members have mobile communication devices, such as mobile phones. The data processor can be a computer server and typically includes a microprocessor and computer memory and either has, or has access to, a database of information. The data processor transmits member-intended information to mobile communication devices of members, where the member-intended information comprises at least a portion of the demographics of the people at the venues. In addition, the data processor can also include trait and behavior information of members, location information received from the mobile communication devices and characteristic information concerning the venues. The mobile communication devices may comprise global positioning system (GPS) capability, or other convenient position-sensing capability, to provide location information. The data processor can process the information present in the data processor and typically provides venue-intended information that may include trait information, demographics and behavior information of the members or people, where people includes non-members. The data processor typically also provides member-intended information that may include in addition to the other information indicated above, characteristic information and promotional information. The data processor can also serve to receive information from the venues, such as characteristic and promotional information, and in addition it can receive location information and characteristic information from the members. The data processor can also serve as an intermediary between members.

Typically the system data processor stores information concerning traits and behaviors of the members, venue characteristics, and other information, in a database. A computer program running on the data processor can use the location and trait information of members to determine the demographics of members, including the number of members, at the venues, and optionally estimate the demographics of attendees (i.e., including non-members) at the venues. The computer program may also determine the demographics of members, and estimate the demographics of people, in the vicinity of the venues. The computer program may also predict, based on the number of members using the system, how many people may soon arrive to a venue.

The system is also capable of providing a service to sponsors, where venues and sponsors are collectively referred to here as "promoters." Sponsors are typically advertising entities, other than venues, such as merchandisers. The data processor can receive promotional material from promoters wanting the attention of members and, optionally using instructions from such promoters, can send to, or otherwise make the promotional material available to, members of the system. Such instructions may comprise directions for how a particular promotion should be directed to members of a desired demographic group, a member possessing a desired trait or a member exhibiting a desired behavior.

The system of the subject invention applies generally to any venue where people aggregate, including nightclubs, bars, restaurants, etc., i.e., places associated with groups of people who don't necessarily know each other and are interested in an enjoyable experience which may be associated with entertainment. To help clarify how the subject invention may be practiced, much of the following discussion describes the case where the venue is a nightclub or bar. In most scenarios discussed, where the word "nightclub" is used, the scenario can equally apply to a "bar."

The system of the subject invention is referred to here as the "Hoozware™" system, a play on the phrase, "Who's where?" The Hoozware system is a service which helps nightclub managers target advertisements to specific desired clientele who are members of the Hoozware system. Members of the Hoozware system in turn are encouraged to use the Hoozware system in order to receive benefits, including: financial benefits from operators of the Hoozware system, promotions from nightclubs and receiving information regarding characteristics of, and demographics of attendees at, the nightclubs, where some of the information comes in real time from other members of the Hoozware system who are attending, or recently attended, the nightclubs. The Hoozware system helps the nightclub managers efficiently and effectively determine which members fit the profile of clientele they seek to entice to their nightclub at a particular moment in time. The Hoozware system also helps its members efficiently use their time to determine which nightclub has the atmosphere, music, crowd, etc., they desire at a particular moment in time. Hotels could provide their hotel guests with a "guest" membership to the Hoozware system to use while they're in town and/or staying with the hotel, to aid their guests in efficiently using their time to find a local hot spot to hang out at after they've finished with their business for the day.

The Hoozware system helps a venue find answers to the following questions and contact relevant members with promotional material: (1) Who is currently at other competing venues; (2) who is in the vicinity; (3) who is out now who was previously at their venue; (4) who has not already been to their venue; (5) who likes the type of entertainment, including type of music, that their venue is offering; and the like.

The Hoozware system relies largely on Hoozware system members for automatically and voluntarily providing data which are compiled by the Hoozware system and used by the nightclubs to attract desired clientele, and used by other Hoozware system members to determine desirable nightclub destinations. Members "opt in" to the Hoozware system, and typically either load Hoozware system software onto their GPS-capable mobile telephone (sometimes simply referred to here as their "GPS mobile phone") or access the Hoozware system using a web browser on their phone. When referring to a GPS mobile phone it can also mean a phone with any other convenient position-sensing capability. In brief, the Hoozware system tracks the position of its members and compiles statistics about the members that are attending each nightclub and makes the statistics available to the nightclub managers and to other members.

Certain data provided by members of the Hoozware system are typically sent wirelessly by the member's mobile phones to a Hoozware system server computer. When a member opts into the Hoozware system they typically must agree to allow the Hoozware system software that is on or accessing their GPS mobile phone to persistently provide, or to provide during certain windows of time, the GPS position of their mobile phone to the Hoozware system server, which position is also assumed to be the position of the member. The Hoozware system server runs a computer program with a computer algorithm which compares each member's updated variable position to the known fixed position of each nightclub. The computer program may classify a member as: a nightclub candidate, in proximity to a nightclub, on the way to a nightclub, at a nightclub, etc. Such classification may be used by nightclub managers to determine which targeted advertisement to send to the member. Such advertisements are sent by the nightclub manager to the Hoozware system which then directs the advertisement message to the desired member's mobile phone, or otherwise makes the advertisement message available to the member.

A member might be classified by their GPS, or otherwise sensed, location (such as if they're in a particular neighborhood or restaurant), proximity to other members, the day of the week and time of night, as well as their previous nightclub history or previous pre-nightclub activity, to be a "nightclub candidate." By using the GPS location information of a member to track a particular behavior, such as their particular route or trajectory, a member might be classified as "on the way to a nightclub." By using the GPS location information of a member to track their trajectory to a nightclub and then observing that the GPS signal disappeared while the member's GPS mobile phone is still turned on, the member might be classified as "at a nightclub."

When a Hoozware system member opts in, typically the Hoozware system application on, or accessed by, their GPS mobile phone persistently submits the Hoozware system member's position to the Hoozware system server for behavior analysis and comparison with nightclub locations. Alternately, a member might allow their position information only to be sent to the server at specific times. However, typically, a member is only permitted to inquire about nightclubs and other members during the time when their own information is provided to the Hoozware system server, thus encouraging members to make their own information known as much as possible. For instance, for privacy reasons, a member might restrict that their position information only be provided to the Hoozware system server on Thursdays, Fridays and Saturdays from 9:00 p.m. to 3:00 a.m. the following morning. In this case, the member would only be allowed to inquire and access statistics of other Hoozware system members and nightclub characteristics during that same timeframe to see where the hot nightclubs are located. In another scenario, a member might restrict their position information to be updated Tuesdays through Saturdays between the hours of 3:00 p.m. to 3:00 a.m. In this case, the member would be allowed to inquire and access statistics of other Hoozware system members and nightclubs (or bars) to additionally know which venues are the hot happy hour locations. In another scenario, a member's position information may be sent to the Hoozware system server for a period of time after they have done a nightclub search.

Nightclubs may place general or highly targeted advertisements with the Hoozware system to be provided to members of the Hoozware system, either asynchronously, or at strategic times, such as when the Hoozware system member is requesting information on other Hoozware system members or a nightclub, or the Hoozware system otherwise determines that the member is a "nightclub candidate." Members typically receive such ads, or receive notification that such ads are accessible, visually and/or aurally on their mobile phone, but members may also receive such ads, or receive notification that such ads are accessible, via email to their home computer, postal mail to their physical address, or any other way people receive advertisements. For instance, the Hoozware system may inform one or more nightclubs that the Hoozware system has classified a member as a "nightclub candidate." A nightclub that the Hoozware system informs of the candidate may request that the Hoozware system provide an advertisement to the Hoozware system member, with an "offer number," such that if the member arrives at their nightclub by a particular time and presents the offer number they will receive a benefit, such as a discounted cover charge or drink special, etc. Thus, a nightclub can place real-time, highly targeted and focused ads with the Hoozware system, which ads may, for example, be based on whether or not the nightclub is behind its attendance or drink revenue quota at a particular time. The Hoozware system may also post and advertise, or allow a nightclub to post and advertise, the nightclub's website, phone number or other marketing information provided by the nightclub.

The Hoozware system may track which members redeem ads and charge the advertising nightclub a rate graduated to the effectiveness of the ad. For example, in the case where more members redeem an ad, the effectiveness of the Hoozware system is more valuable so the nightclub is charged more than the case where fewer members redeem the ad. In another example, the nightclub may be charged a portion of the nightclub's benefit from a Hoozware member redeeming the ad. This reduces the cost risk to a nightclub to place an ad while increasing the benefit to the Hoozware system for an efficient ad and assuming some of the risk.

The Hoozware system may also provide statistics on the Hoozware system members to taxicab companies and to other organizations interested in knowing the traits or behaviors, including temporal movement patterns, of the Hoozware system members. In this way, taxis might adjust where to sit at particular times on particular nights according to the crowds on hand. Hoozware system members detected as leaving a nightclub may be queried, through the Hoozware system, whether they need a taxi. If so, the Hoozware system may find a taxi for them and receive a financial benefit from either the taxi service or the member as a service fee.

Hoozware system members may elect to be notified when their desired crowd demographics or nightclub characteristics, including atmosphere, band, etc., for one or more nightclubs change. For instance, if the percentage of single women at a first nightclub that a male Hoozware system member is attending drops below 40%, while the percentage at a second nightclub in the area moves above 60%, the Hoozware system may send the male member a text message (or any other effective notification) alerting him to that fact. The Hoozware system may also inform the second nightclub of the male member's desired demographics and characteristics and suggest that the second nightclub send the male member a special offer through the Hoozware system to entice him to switch nightclubs. For example, the second nightclub may then send him a targeted message asking him if he'd like a taxi, a reduced cover charge and drink special to switch from the first nightclub to the second nightclub. The Hoozware system may also inform the first nightclub of the male member's desired characteristics and suggest that the first nightclub send the male member a special offer though the Hoozware system to entice him to stay. Accordingly, the Hoozware system may include features for nightclubs to, in effect, set up bidding wars for clientele. For example, a nightclub that a Hoozware system member is not attending may be encouraged to send a special offer to the Hoozware system member to lure him or her away. Similarly, the nightclub that the Hoozware system member is presently at may be encouraged to offer the Hoozware system member specials, such as drink discounts, to encourage him or her to stay at their nightclub.

Dictionary.com defines "demographic" as "of or relating to demography; 'demographic surveys' n: a statistic characterizing human populations (or segments of human populations broken down by age or sex or income etc.)."

Thus, the Hoozware system presents useful summary numbers regarding its members in useful categories to its members. Rather than merely listing people present at a venue along with all their traits and requiring a receiving member to digest the data, the Hoozware system processes the traits of those people present at a venue and presents a summary of the information which may include desired categorical statistics, i.e., demographics. For example, rather than just providing the following data for members present at a venue: Bill, male, 25; Amy, female, 31; Jill, female, 29; the Hoozware system may provide the following data: 3 members present; 66% female/33% male; 66% of members in age range 25-29; 50% of females in age range 25-29.

The Hoozware system may allow a particular member to be classified by, or to register with, the Hoozware system or a particular nightclub as a "preferred customer." For instance, a heavy drinker, or beautiful woman, may be classified as a preferred customer by a nightclub. Such classification allows the nightclub to be alerted when the preferred customer is nearby and so the nightclub may provide them a special targeted incentive, via the Hoozware system, to encourage the preferred customer to come to their nightclub.

Selected people, including representatives of the Hoozware system, representatives of the venues, other members, etc., may be permitted to evaluate traits of the members and rate the significance of such traits. For example, representatives of the Hoozware system may inspect photographs of the members and provide a "rated attractiveness" trait. Such a rated trait may be normalized such that the average rating is 5 out of a possible 10. Venues may be charged more to provide promotions to a certain demographic, such as to a portion of the member population with a rated attractiveness above a certain level. There may be several attractiveness trait categories, including self rated, member rated, Hoozware rated, venue rated, etc.

Much has been described thus far regarding the services that the Hoozware system can provide to a venue, such as a nightclub or bar. However, the Hoozware system can provide more value to a nightclub as the member base and amount and quality of data provided by the members of the Hoozware system increase. Thus, the Hoozware system may provide reward incentives to encourage people with GPS mobile phones to (1) become a Hoozware system member, (2) make their location known to the Hoozware system server for as long as possible, (3) provide their personal data, (4) post useful information regarding nightclubs they are attending or recently attended, etc. Exemplary reward incentives which may be provided to Hoozware system members are described below.

Hoozware system members may be provided a graduated system of rewards, financially or otherwise, for contributing information. For instance, Hoozware system members may be rewarded more if they permit their GPS mobile phone to update their position more frequently or for extended periods throughout the week. Other rewardable contributions may include: confirming that they've entered a particular nightclub; posting their personal data; frequency of use of the Hoozware system; posting of comments or other media, including photos, movie/video clips, audio clips, voicemails, emails, and the like from the nightclub; accepting a venue's or sponsor's promotion; etc. Hoozware system members may receive more rewards based on the quality of their postings, according to amount of use or ratings as determined by inquiring Hoozware system members, or as determined by other means. Rewards may include sharing of Hoozware system financial profits, such that the Hoozware system is a co-op, where the most loyal, contributing members receive the most rewards. Other rewards may include incentives offered by the nightclubs, discounted phone bills, airline miles, store credits, drink specials, cover charge specials, Hoozware system honors, and the like.

As mentioned previously, the Hoozware system tracks the position of its members and compiles statistics, demographic information, and behavior information about its members. The Hoozware system makes certain information and statistics about the members available, either directly or indirectly, to the nightclubs (or in general, to promoters or other Hoozware partners), in addition to other Hoozware system members. For example, using the GPS location of its members, the Hoozware system computer program running on the Hoozware system server determines whether or not to classify a member as attending one of the nightclubs at a point in time. Other Hoozware system members may then receive information informing them of the demographics of members in attendance at each nightclub, including the number of members there, and even an estimate of the total number of people in attendance, which additionally accounts for non-Hoozware system members. Such an estimation is discussed later.

Hoozware system members can use the Hoozware system to determine before going out for the evening, or even while in attendance at one nightclub, which other nightclub has a "desirable crowd." An "inquiring member" may receive from the Hoozware system the number of people known to be in attendance at each nightclub. Typically, if the inquiring member has provided their own demographic information they can also receive a compilation of similar demographic information of the crowd at each nightclub. Under certain circumstances, a member may also be allowed to "drill down" and review more detailed information related to the personal profile of a particular Hoozware system member, where the personal profile includes personal data.

Members using the Hoozware system to help them determine which nightclub to attend may receive characteristics about the nightclubs, as well as, information about the crowds in attendance at the nightclubs, including crowd sizes, other demographics, attendee photos, and the like. Hoozware system members may also use their mobile phone, PDA, home computer, etc., to post their own comments about a club they're attending or attended recently. Hoozware system members may also post geotagged data for a nightclub (that is, data associated with the geographical location of a particular nightclub), including photos, movie/video clips from the nightclub, sound clips (e.g., of the DJ, band, sound system, etc.), and the like, which helps other members to get a better sense of the nightclub atmosphere, the type of music being played, the type of clientele in attendance, the lighting, and the like.

Members may inquire and receive information about the nightclubs in textual form, graphical form, auditory form, tactile form or a combination. In one embodiment, a Hoozware system member accesses the Hoozware system using their GPS mobile phone. They may narrow a nightclub search space by selecting a desired city, with an optional search radius. Alternately, they may narrow a nightclub search space by defining a geographical search space using landmarks, such as streets, bridges, rivers, buildings, county lines, state lines, other geotagged objects and the like, or distances from such landmarks. Hoozware system members may define "moods" that direct their nightclub search by listing in decreasing order of preference, or listing with weighting factors, what they feel most important to them when searching for a desired nightclub at that time. For instance, as the most preferred search criterion, a member might request a nightclub with the most people; as a second preferred search criterion a member might request the highest ratio of single heterosexual women to men; as a third preferred search criterion a member might request the average age to be 25-29; as a fourth preferred search criterion a member might request a live band; and as a fifth preferred search criterion a member might want the club to be within a five mile radius of where he or she is having dinner.

A computer program with computer algorithm, typically running on the Hoozware system server, digests data about each nightclub, including data provided by other Hoozware system members, data provided by the nightclub itself (such as whether they have a live band), and data available from other sources, and ranks the nightclubs in the member's selected search space based on the preferential criteria defined by the member (such as the "mood" provided by the example in the previous paragraph). In one embodiment where a Hoozware system inquiring member specifies a particular city as the desired search space as part of their "mood," a graphical map appears on the inquiring member's GPS mobile phone display with icons located on the map representing nightclubs. The nightclub scoring the highest rank by the Hoozware system server, for instance, which is the closest match to the member's defined mood, is displayed with a red color (i.e., "hot!"); the next highest rank may be displayed in a color closer to orange; etc.; with the lowest ranking nightclub being displayed with a blue color (i.e., "cold."). The map may be zoomed and scrolled to provide more detailed information about a particular nightclub. As an alternative to, or in combination with the map-based display, a text-based list of nightclubs with score ranking may be displayed. A particular nightclub may also be specifically selected by the inquiring member in order to receive more details about that nightclub. An example of specific details that an inquiring Hoozware system member might receive is: (1) 347 Hoozware system members; 412 total estimated attendees; (2) 63% single heterosexual women; (3) 28 years average age; (4) 80's cover band started at 10:00 p.m. and (5) 3.7 miles away; approximately 10 minutes by taxi.

The total number of attendees may be determined by a variety of estimation methods. By estimation, it is intended that from a known measurement, a calculated value is obtained based on an algorithm. For instance, if previously the total number of attendees at a nightclub was counted by the nightclub, or by another organization, and compared with the number of Hoozware system members at that nightclub to establish a ratio (total attendees/number of members), then that same ratio could be applied to (multiplied by) the number of Hoozware system members on another night to estimate the total number of nightclub attendees. This same technique could similarly be applied to estimate other totals for a nightclub, such as the total number of single women, the ratio of women to men, etc. Any convenient method for estimating the demographics for the entire crowd at a nightclub based on the demographics of members at the nightclub may be used.

Hoozware system members may define different desirable "mood" profiles, where depending on the member's mood, they may specify different nightclub rankings. For instance, a male Hoozware system member might define his default mood as "Meeting women," which specifies his most important search criterion as "The largest percentage of single females," and a second most important search criterion as "Hip hop DJ." The member might define a second mood profile as "Hanging with the boys," with his most important search criterion specified to be "Drink specials," and his second most important search criterion as "Pool table."

The computer algorithm that ranks the nightclubs for each member may employ search and ranking algorithms, such as provided by companies like Google, Yahoo!, Microsoft, AskJeeves, and the like. The computer algorithm may also employ classification algorithms, including but not limited to statistical classification techniques (including Bayesian Decision Theory, etc.), vector quantizers, neural network algorithms, other Computer Science search and ranking algorithms, and the like.

Typical inputs to the computer algorithm include data such as: member traits, nightclub demographics and nightclub characteristics. Member traits are personal features, beliefs, lifestyles, etc. of a member that are typically either inherited or chosen by the member. Member traits typically comprise: age, sex, sexual orientation and preference, education, race, religion, smoker/non-smoker, marital status (e.g., single/married/committed/divorced), parental status, financial status, occupation, home zip code, political affiliation, pictures, both direct and anonymous contact information, friend status, group status, as well as other online dating categories including physical attributes (e.g., height, weight, eye color, hair color, balding, body type, attractiveness, etc.), etc. There may be several attractiveness trait categories, including self rated, member rated, Hoozware rated, venue rated, etc.

Nightclub demographics comprise statistics of the population at a nightclub. Nightclub demographics typically comprise the number of members in attendance at a nightclub, the number of members plus estimated non-members in attendance, as well as, statistics of the trait categories of the members, where the statistics typically include the number and percentage of members possessing a particular trait, etc.

Nightclub characteristics are features, rules, etc., that an attendee may find important, attractive or objectionable about a nightclub, other than aspects directly attributable to the other clientele in attendance, such as the demogrphics. Nightclub characteristics typically comprise: location, type of music (e.g., radio, CD, DJ, band, etc.), genre of music (e.g., rock, classical, country, jazz, easy listening, 70's, 80's, 90's, etc.), atmosphere (subjective coolness, romantic/not romantic, lighted/dark, clear/smoky/hazy, loud/quiet, cold/hot, cramped/open, etc.), cover charge/no cover charge, attire (e.g., casual, business casual, formal, etc.), expensive/cheap, drinks/food available, drink specials, pool table, dancing/no dancing, coat check, closing time, website, member-supplied media postings (e.g., text ratings and comments/photos/audio clips/video clips, estimated number of attendees, estimated age range, estimated ratio of women to men), etc.

The data input to the computer algorithm that ranks the nightclubs for members may include weighting factors. The weighting factors may be set by the member to indicate the relative importance of a portion of the data. The weighting factors may also be set automatically, for example, based on how recent the member postings are.

To assist nightclubs to efficiently target members to whom to send their promotional material, the Hoozware system server (a.k.a., data processor, computer) tracks member behaviors. Member behaviors typically comprise: prior types of accepted promotions, spending habits, drinking habits, venue attendance habits (e.g., the venue the member is at now, venues the member frequents), temporal habits, parking habits (e.g., where the member parks before going to a venue), walking habits (e.g., the path the member takes in going to a venue), where the member eats before going to a venue, types of products the member buys, number of rewards points, particular venue or Hoozware premier status, Hoozware member usage frequency, etc.

To help a member classify their various inclinations, the Hoozware system allows members to define "moods" or select previously defined moods. Typical mood categories comprise: prowl, ladies/guys night, rowdy, quiet, dance, drink, pool, chat, live music, comedy, happy hour, sports, drag, etc. Members typically define their moods by accessing the Hoozware system server from their home computer; although, mood functionality may be accessed using their mobile phone. When defining a mood, a member typically selects nightclub attendee demographics and traits and nightclub characteristics, typically using a set of drop-down boxes, radio buttons, and the like. Additionally, the member may use drop-down boxes or fill-in boxes to enter weighting factors for each of the selected demographics, traits and characteristics. If no weighting factors are entered, the Hoozware system server typically uses default weightings, such as equal weighting, for each demographic, trait and characteristic. For instance, a male member may define his "prowl" mood to include, and highly weight, the demographic categories covering the number of non-committed women between the ages of 25 and 35. His prowl mood may also include, but assign a lower weighting to, dancing as a nightclub characteristic. A woman member might define her "chat" mood to include and equally weight a demographic preference for few men and characteristics of quiet country music, no cover and cheap drinks.

When a nightclub (or in general, a "promoter," which is used here to include "venues" and "sponsors") wants to send promotional material to a member, the nightclub may access the Hoozware system server (typically by logging into the Hoozware website from an office computer) and specify which promotional material they would like to be sent to a subset of members which is associated with one or more desired demographics or which exhibits a desired behavior.

When a member is trying to decide which nightclub (or in general, which venue) to attend, they may access the Hoozware system server, typically using their mobile phone.

A member may communicate with the Hoozware system server using a WAP or other mobile browser, SMS (short message service) or MMS (multimedia messaging service), emailing, running a custom Hoozware application on their mobile phone (which may include JAVA, or be written for or using BREW, Symbian, RIM, Microsoft, Windows CE, Palm, EPOC, FLEXOS, OS/9, JavaOS, etc.), and the like. When the Hoozware system server receives a member request for a list of nightclubs that best match the member's selected "mood," the server performs the search calculation and returns the nightclub list, along with detailed nightclub demographics and characteristic information for the member to review. Typically, along with the ordered nightclub list, the Hoozware system server also returns relevant nightclub or sponsor promotional material to the member.

Present GPS technology used in mobile phones requires line-of-sight communication with multiple satellites. Accordingly, when a Hoozware system member using a GPS mobile phone enters a nightclub typically their GPS signal will be lost. When a Hoozware system member's GPS signal disappears, the computer algorithm of the Hoozware system server may estimate what happened to the Hoozware system member. For example, if the Hoozware system server can no longer communicate with the member's GPS mobile phone, the computer algorithm running on the server may estimate that the mobile phone was turned off. If the Hoozware system server can still communicate with the member's GPS mobile phone but the GPS mobile phone can't provide position information, the computer algorithm running on the server may hypothesize that the member has walked inside a building. At that point, the computer algorithm running on the Hoozware system server may extrapolate, or otherwise estimate, using previous position data points in time, as well as any other relevant data available (such as previous history or patterns of behavior), whether the Hoozware system member was walking toward the entrance of a nightclub when the member's GPS position information disappeared such that the member should be classified as being in that nightclub.

Other position-sensing technologies may be employed to track members outside and inside a nightclub. Example position-sensing technologies include EOTD (enhanced observed time difference) between cell towers, BlueTooth wireless proximity sensing, WiFi proximity sensing, pseudolites, ultrasonics, electromagnetics, infrared technologies, and the like.

When the computer algorithm running on the Hoozware system server estimates that a member has entered a particular nightclub, it may send a query to the member asking them if indeed they are in the classified nightclub. The Hoozware system member may respond with Yes or No, may provide an alternate location, or may provide another response. If the computer algorithm running on the Hoozware system server receives an affirmative response from the Hoozware system member, that member is classified as a confirmed attendee at the nightclub. Typically, if no response is received, the computer algorithm running on the Hoozware system server classifies that member as an unconfirmed attendee at the estimated nightclub.

When a Hoozware system member is classified by the computer algorithm running on the Hoozware system server as being at a particular nightclub, if the member generates media, e.g., takes a picture, records a movie/video clip, records an audio clip, types a text message, types an email, records a voicemail, and the like with their GPS mobile phone, the Hoozware system application on their mobile phone may insert a prompt requesting that they post that geotagged information to the Hoozware system server. Thus, the Hoozware system makes it very easy and convenient for Hoozware system members in attendance at a nightclub to provide real-time geotagged information about the nightclub to add to the characteristic information about the nightclub for other Hoozware system members to receive.

The Hoozware system may also offer social networking and dating services to its members. For instance, Hoozware system software may allow members to enter personal data about themselves into their own personal profile, including but not limited to attributes commonly included in dating service surveys, such as the member's sex, age, physical attributes, interests, etc., and also similar types of personal data about what they would like to see in people they would like to meet at a nightclub. The Hoozware system may permit the member to verbally record a special greeting. Typically, the Hoozware system requires a member to enter their own personal data first in order to be allowed to receive similar types of data about other Hoozware system members. For example, if a member entered that he was a male, between 25 and 29 years of age, and included a picture, then when that member was determined by the Hoozware system using the member's GPS position to be at a particular nightclub, the member's data would be compiled into the statistics of all members classified as attending that nightclub. Such compiled statistical data would be receivable by other members who also provided their sex, age and picture. If a member only provided a subset of personal data (such as their age) they typically would only be allowed to receive a similar subset of compiled statistical data of the members (such as the ages) in attendance at the nightclub.

If a member specified in their personal profile that they would like to be contacted by other Hoozware system members, they can specify under what circumstances and how they would prefer to be contacted, including by voice on their mobile phone, text message on their mobile phone, voicemail, email, physical mail, etc., either directly or anonymously via the Hoozware system server. If they request anonymous contact, then an inquiring member would use the preferred method of contact; however, the content of the contact attempt would first go to the Hoozware system server. The member to be contacted is then sent the content of the contact attempt from the inquiring member without revealing the direct contact information of either member to the other. Typically included in the content anonymously sent from one member to the other is a capability for allowing each member to mutually share one or more elements of their direct contact information with the other. For example, if a first member elects to mutually share their mobile phone number, the second member is informed of that election in content anonymously provided to the second member. Until the second member also elects to mutually share their mobile phone number, neither party will be allowed to view the mobile phone number of the other. Of course, the first member may include their mobile phone number, or other direct contact information, directly in the content anonymously sent to the second member, or vice versa. A member may specify that only Hoozware system members at the nightclub they're at be allowed to contact them; or alternatively, a member may specify that prospective attendees may be allowed to contact them. The Hoozware system may charge a service fee for Hoozware system members to gain access to another Hoozware system member's personal profile or information related thereto, assuming that the profile or information was specified by the member to be accessible. The Hoozware system may also work with, provide information to, or receive information from, other online or mobile dating services, and receive financial benefits or other benefits therefor.

The following description details one embodiment of the subject invention.

1. Introduction

The Hoozware

The Hoozware system consists of server, non-mobile and mobile device components that work together to implement mobile-centric venue information and marketing services. The system leverages member-driven content, including location-based commentary, demographics and behaviors, to promote community amongst members and to provide marketing opportunities for promoters, i.e., venues and sponsors. Targeted venues include night clubs, bars, and music scenes where people aggregate for entertainment and socializing.

2. Feature Summary

The system is used by tracked members, registered venues, registered sponsors, and system administrators. Members carry mobile devices which enable location tracking by the system, provide access to demographic, behavior and other information relevant to their decisions on which venues to visit, and facilitate interaction with other members. Venues and sponsors typically access the system via the desktop (rather than a mobile device) in order to query demographics, setup marketing campaigns and monitor campaign results. Venues may also publish entertainment schedules and other information that members access from their mobile devices. Venues and sponsors are both promoters, such that referring to a promoter can mean either a venue or a sponsor that is interested in providing a promotion to a member.

3. Members

Members use the system to access venue information, such as demographics and characteristics, and to participate in an incentive rewards program.

3.1. Venue Information

Information includes venue descriptions, member commentary, and population data. Venue descriptions typically are supplied by venues or acquired from a third party database, and may include music schedules and other events. Member commentary may include ratings, reviews, and current blogs, typically with multimedia content. Population data may include present or historical demographics and lists of members present.

3.2. Rewards Program

The incentive rewards program allows members to accumulate points for various actions and to exchange these points for discounted products and services from promoters. Reward items may include drinks and cover charges at clubs, meals at restaurants, limousine services, hotel stays, sports merchandise, music downloads, electronics, event tickets, airline tickets, cash, shopping discounts at department stores or other retailers, etc.

A member may receive reward points for purchases at a venue or from a sponsor, whether or not the purchases are in response to a venue or sponsor promotion. While the six purchase scenarios below refer to purchases at venues, the same scenarios apply to purchases from sponsors.

To receive points in a first scenario that doesn't require any cooperation from venues a member may keep purchase receipts, enter them on the Hoozware website to generate a receipt-submission form (typically which includes an associated receipt-submission ID), printout the receipt-submission form and send it, such as by mailing, along with the receipts, to a Hoozware address.

In a second scenario that does require cooperation from the venues, immediately after a purchase a member enters the amount of the purchase into the Hoozware application accessed by their mobile phone and then hands their mobile phone to the cashier who then reviews the purchase amount, and if correct, enters their unique cashier password into the member's mobile phone and presses the SEND button (or other selected button). The amount of the purchase and the cashier's identity is sent to the Hoozware system and optionally also sent to the venue for the venue's records.

In a third scenario that also requires cooperation of the venue, at the time of purchase the member gives the cashier the member's unique rewards ID number. The venue then associates the member's rewards ID with the purchase amount and provides the information to the Hoozware system. The member may provide their rewards ID number by any convenient method, including entering the number into a data terminal, providing a rewards card or transmitting the rewards number via a phone.

In a fourth scenario, the member's rewards ID number and payment information, such as credit card number or debit card number, may both be transmitted by the member's mobile phone, such as by wireless transmission.

In a fifth scenario, the member uses their mobile phone to call a venue-rewards-credit telephone number. The Hoozware application communicates the members name and minimum amount of the credit card number or debit card number information in order for the venue to associate charges made at the venue with the member and report the information about the products purchased by the member to the Hoozware system.

In a sixth scenario, requiring cooperation of the credit card or debit card company or bank, when a purchase is made using the member's credit card or debit card, the associated credit card company or bank sends confirmation to the member's mobile phone. The Hoozware mobile application captures the confirmation and submits item(s) purchased, venue, time, purchase amount(s) and other important information to the Hoozware system server which records the information and updates member behaviors, rewards points and statuses (such as VIP status) with the venues and sponsors that the purchases relate to. Alternately, the credit card company or bank may send confirmation to a separate website, the member's home computer, the Hoozware system server, and the like, from where the member then requests rewards credit for the purchases.

3.3. Accounts

To establish accounts, new members supply the following information:

username, password, first name, last name, email, mobile number

Usernames must be unique to individuals in the system. These data are used for account access, maintenance, and communication. They are not disclosed to third parties.

Reward points are given for successful registration. Additional reward points are given when other members are referred.

3.4. Profiles

Members describe themselves by entering personal data into personal profiles comprising demographic and personal fields. The system also records member behavior statistics in behavior fields.

Demographic fields list member traits that can be statistically combined to provide demographics information for anonymous population tracking and targeted marketing. These trait fields typically include:

general: birthday, gender, education, occupation, marital status, parental status, home zip code, political affiliation, salary range sports: leagues, teams/players music: genres, performers tags: other member input, such as interests Any presentation of demographic information to venues, sponsors, or other members are not identifiable with specific individuals.

Personal fields are used for social networking and commentary attribution, and do identify specific individuals. These personal fields typically include:

nickname, personal statement, photo

Nicknames must be unique to individuals in the system and should be different from usernames. Personal statements are textual introductions by the members. Default photos may be system-supplied defaults if not replaced by the members.

Behavior fields record prior types of accepted promotions, spending habits, drinking habits, attendance habits, temporal habits, parking and walking habits, etc.

3.5. Groups

Members may organize themselves into groups to facilitate common personal visibility and messaging. A group typically consists of:

groupname, leader (nickname), member list (nicknames)

Groupnames must be unique to groups in the system. Each group has a leader who is responsible for creating and maintaining the list of its members. Additions to the list require consent of both the member and the leader. Deletions from the list may be issued by either.

If group filtering is enabled, personal fields of a member's profile are visible to other members only if they belong to a common group. Members may belong to more than one group simultaneously.

A member may request that they be invisible to a specific member while being visible to other members.

3.6. Tracking

During certain time periods, member locations may be tracked so that their presence at or near venues is known to the system. The system may consolidate and present real-time, anonymous, venue demographic data to other members. The system may also, subject to personal visibility control, display a list of which members are present at each venue using their personal fields.

Members typically select a default tracking window from the following:

| | |
|---|---|
| Happy Hour Hoozware | Wednesday-Friday 3 pm-8 pm. |
| Night Flight Hoozware | Thursday-Saturday 8 pm-3 am. |
| Super Party Hoozware | Combination of Happy Hour and Night Flight windows. |
| Ultimate Party Hoozware | Continuous window. |

There may also be special sports windows, for instance, to allow members to search venues to watch playoff games at times that don't fall into one of the other tracking windows.

Tracking is automatically turned on at the beginning of a member's window and turned off at the end of a member's window. If a member accesses the system for real-time demographics outside of their default window, then the shortest enclosing window is automatically applied to their tracking schedule for that day. For example, if a member whose default window is Night Flight checks current demographics on Friday at 4 pm, then they are automatically subscribed to Happy Hour tracking until 8 pm (for that day only), at which time their Night Flight default continues to track until 3 am.

Reward points are typically given based on the number of hours a member is tracked.

3.7. Commentary

Members are encouraged to contribute comments on venues. These take the form of ratings, reviews, and blogs. Ratings and reviews are overall impressions of the venue. Blogs are typically shorter posts with more immediate value, e.g., "Tonight's scene rocks!" Multimedia content is typically also included.

Reward points are given based on the number and quality of a member's comments. Quality is measured by usefulness, typically rated by other members.

3.8. Privacy

These policies shall be observed to respect member privacy while offering relevant information to users of the system.

3.8.1. Tracking Control

Powering off a mobile device prevents tracking, but only until the device is powered on again. However, an interface allows a member to disable tracking in software and have this be effective until 3 am the next day (remainder of the daily cycle) or for a specified multi-day period (vacation stop). The interface also allows the member to reverse this selection.

3.8.2. Personal Visibility Control

Members may choose the exposure level for their personal fields. Personal visibility may be set to: seen by all (no group filtering), seen only by groups (apply group filtering), or seen by none (hide). If someone is being tracked but does not appear on a list of members present at a venue, they are either not present or just personally invisible to the viewer; these possibilities are indistinguishable to the viewer.

3.8.3. Status

Indicators are provided to members so they may easily determine their tracking status (on/off) and personal visibility status (all, groups, none) at any time.

3.8.4. Protection

Member behavior is not observable beyond intended members of the system. To protect against sniffer attacks, member tracking packets are encrypted.

Demographic data are not easily identifiable with specific individuals. To protect against geographic/demographic inference methods, demographic data may be obscured for venue population counts below a threshold.

Typically member lists are not provided for locations other than venues.

3.8.5. History

Typically, individual dated trajectory histories of tracked members are not retained by the system, but some statistics are accumulated.

3.9. User Interface

Members access the system from both the desktop and their mobile device. Functionality is organized into the following sections which correspond roughly to screens or pages:

Setup/Maintenance:
  Open/close account (typically desktop-only)
  Update profile information (typically desktop-only)
  Update tracking window
  Update/manage groups
Privacy Control:
  Update tracking
  Update personal visibility
Venue Search:
  Edit "moods" and search types (i.e., ranking criteria)
    closest location to current location
    most offers available
    most members present
    most M members present
    most F members present
    highest rating from other members
    best match to custom demographic
  One-time search (typically mobile-only)

Continuous search; optionally alert when rank changes (typically mobile-only)
List/map of search results (typically mobile-only)
Select a venue to view
Venue View:
Venue description
Commentary—read, grade, add new
Current demographics (typically mobile-only)
Current members present (typically mobile-only)
Current offers
Member Search:
Contact list—groups, other people
One-time search of member locations (typically mobile-only)
Continuous search; optionally alert when location changes (typically mobile-only)
List/map of search results (typically mobile-only)
Select a member to view
Member View:
Personal fields
Current location (typically mobile-only)
Contributed commentary
Offer Search:
Reward points available
Current offers (rewards/promotions) with different sorting options
Select an offer to view
Offer View:
Description
Use offer; creates barcode and/or number code; deducts points if a reward is reserved or otherwise redeemed
Delete offer 4. Guests Non-members may access the system via their desktop computer as guests; however, they typically can access only limited features. Guests typically do not have access to the mobile device interface. Typically, a guest sees the same top-level interfaces as members; however, when attempting to access information limited to members only, the guest is informed that the information they requested is for members only and the system then prompts the guest to register. Typically, guests can see a list of venues and access venue descriptions supplied by the venues. Typically, guests cannot view venue demographics, venue characteristics provided by members or personal profile information. Typically guests may be permitted to view venue or sponsor promotions, but are unable to redeem such promotions and do not receive rewards.

5. Venues

Venues access the system to update their business description and manage their marketing campaigns.

5.1. Description

Initially, venue descriptions will be generated from available databases, but venues may choose to update/correct their own entries. Descriptions may include basic contact information, hours, charges, event schedules, and statements from the venues.

5.2. Marketing

There are two primary ways that venues can market to members. First, they may place standard advertisements on the desktop web interface seen by members (and guests). This is typically implemented using a third-party pay-per-click advertising system such as Google AdSense. Venues setup these campaigns through the third party.

The other, more powerful way, is to market directly to members using system offers (rewards or promotions). Marketing campaigns may be customized according to numerous factors such as demographics, behavior, location, time, and VIP status. In an exemplary pay-for-performance model, venues are charged a placement fee only when the offer is used by a member.

5.3. User Interface

Venues typically access the system from the desktop. Functionality is typically organized into the following sections:
Setup/Maintenance:
Open/close account
Update description
Marketing:
Campaign summary
Create/delete a campaign
Select a campaign to view
Campaign View:
Offer description
Offer type—reward or promotion
Point level, if reward
Limitations—expiration, count
Target location
Target profile
Target patronage—VIP or all
Target time
Usage statistics
Billing:
Credit card
Monthly statements Venues may provide venue descriptions that are accessible by both members and guests (non-members). Venues may post advertisements on a Hoozware website. Venues may provide promotions via the Hoozware system to a member of a demographic or behavioral pattern. Venues may receive and review member demographics and behaviors and select a desired demographic or behavioral pattern to which to send a promotion. Alternatively, the venues may, without receiving and reviewing any information from the Hoozware system, provide instructions to the system regarding to what types of demographics and behavioral patterns they wish to target, and when they would like promotions to be distributed, and let the Hoozware system make the detailed promotional distribution decisions.

Typically, a venue has Hoozware Promoter Application software running on an office computer or mobile phone, or uses a web browser to access Hoozware Promoter Application software running on the Hoozware system server. The venue enters their promotion, selects one or more desired demographics and behaviors and enters the number of members to which the venue wants the promotion sent. The promotion, desired demographic and behavior and number-of-members instructions are submitted to the Hoozware system which then directs the venue's promotion to the desired number of members belonging to the demographic and exhibiting the behavior.

The promotions may be time critical and thus have a short expiration day and time associated with them. For instance, if a venue desires more attendees now, they may place a promotion through the Hoozware system that expires in 30 minutes or is valid only for the next 50 entrants. Allowing venues to efficiently promote to potential attendees who are known by the position of their mobile phone to already be in the area and based on their demographics and prior behavior to be likely attendee candidates is a major advantage of the Hoozware system.

Members may receive venue promotions in a Hoozware "promotion mailbox" on their mobile phone, or members may be notified that they have promotions stored remotely. The member may set up their mobile phone or home computer to provide an indication that there are promotions available, and optionally, how many promotions are available. The indication may be a media signal, such as an audible tone, a visual signal a tactile signal, a combination of signals, etc. Different indications may be configured to indicate promotions of different types, from different venues, and the like. The member may alternately set up their mobile phone or home computer to do nothing until the member calls a promotion-mailbox phone number, or otherwise queries, to request that all promotions be sent at that time. In addition to accessing promotions using a mobile phone, the promotions may also be accessed from a home or office computer, etc.

Members may use their communication device (e.g., mobile phone or home computer, etc.) to view which promotions are currently being offered to them, whether sent to and stored on their communication device or remotely. Members falling within different demographic groups or exhibiting different behaviors will typically see different promotions offered.

Typically, venues can have promotions (1) sent directly to the mobile phone of one or a group of members and/or (2) posted on the Hoozware system server where only promotions relevant to a particular member (for instance, based on their demographics and behaviors) will be viewable by that member when they access the Hoozware system server for their promotions.

A venue may offer promotional coupons to a larger number of members than the venue desires to accept. For instance, a venue may offer a coupon (via the Hoozware system server) for "no cover charge" to 100 members of a desired demographic group or behavior, but the venue may specify that only the first 10 coupons redeemed will be accepted. In one embodiment, members may access in real time from their mobile phone or home computer how many coupons are still being accepted at that time. In the case where the promotion requires members to use points for a coupon, a member may be allowed to "reserve" a coupon in advance. Such a reservation typically immediately debits the member's rewards points, but assures the member that their coupon will be valid to redeem the promotion at a later time, such as when they arrive to a venue.

In one embodiment for redeeming a venue's promotion at the venue, the member shows the coupon (which was sent to them on behalf of the venue) displayed on their mobile phone's screen to a venue representative. The coupon typically has a coupon identifier (ID) associated with it. The display on their mobile phone says to press "OK" to "Validate" the coupon. The venue representative presses OK which causes the Mobile Application to communicate the coupon ID to the Hoozware system server (i.e., data processor). The Hoozware system server then sends a "Confirmation Code" to one or more communication devices of the venue's choice. For example, a Confirmation Code may be text messaged to the venue representative's mobile phone informing the venue representative to accept the coupon. Simultaneously, a Confirmation Code may be emailed to the Promoter Application to log the transaction for future reference.

When a member uses their communication device to check in real time how many coupons the venue is still going to accept at that moment, in addition to being presented with the number of coupons remaining, they may be prompted to (1) press "OK" to validate the coupon now or (2) press "1" to reserve the coupon in advance.

Members typically receive reward points for accepting a promotion, attending a venue, spending money at a venue, and the like. Refer to the Rewards Program in Section 3.2 for more information on how member may receive rewards points for purchases at venues.

Venues may track promotion acceptance or spending habits of members at their venue. One way a venue may track member acceptance of the venues' promotion is for the venue to require that the member show the promotion on their mobile phone that was sent to them. The venue may record a promotion identifier (ID) that was sent along with the promotion. The member may also be required to show their personal-field photo on their mobile phone to confirm that they are the intended member.

6. Sponsors

Sponsors may provide promotions via the Hoozware system similarly to a venue. Sponsors access the Hoozware system to manage their marketing campaigns. Their features and interface are similar to that of the venues, except for the areas of venue description and VIP status may be different. See the description above in Section 5 for Venues, and also refer to the Rewards Program in Section 3.2 for more information on how members may receive rewards points for purchases from sponsors.

7. Administrators

Administrators have access to all stored information, including member personal fields. Administrators may send, or otherwise make available, promotions to members based on vendor or sponsor instructions. Such instructions may request that the system send promotions to members based on the members' demographic or behavior, the day and time, etc. Administrators also control the billing, promotion rates, etc.

8. Carrier/Device Support

Most major carriers, mobile devices and computer systems are supported.

9. Venue Support

The system allows any venue to be listed. Venues may be added in bulk based on business listings/categories acquired from third party databases. For example, the system may add venues appearing in Google Local, CitySearch, SFGate, PubClub, Viator, and the like, as businesses categorized under one or more of the following:

Cocktail Bars & Lounges
Lounges & Bars
Night Clubs
Sports Bars, Lounges, & Restaurants

DETAILED DESCRIPTION OF THE INVENTION

Figure 1:
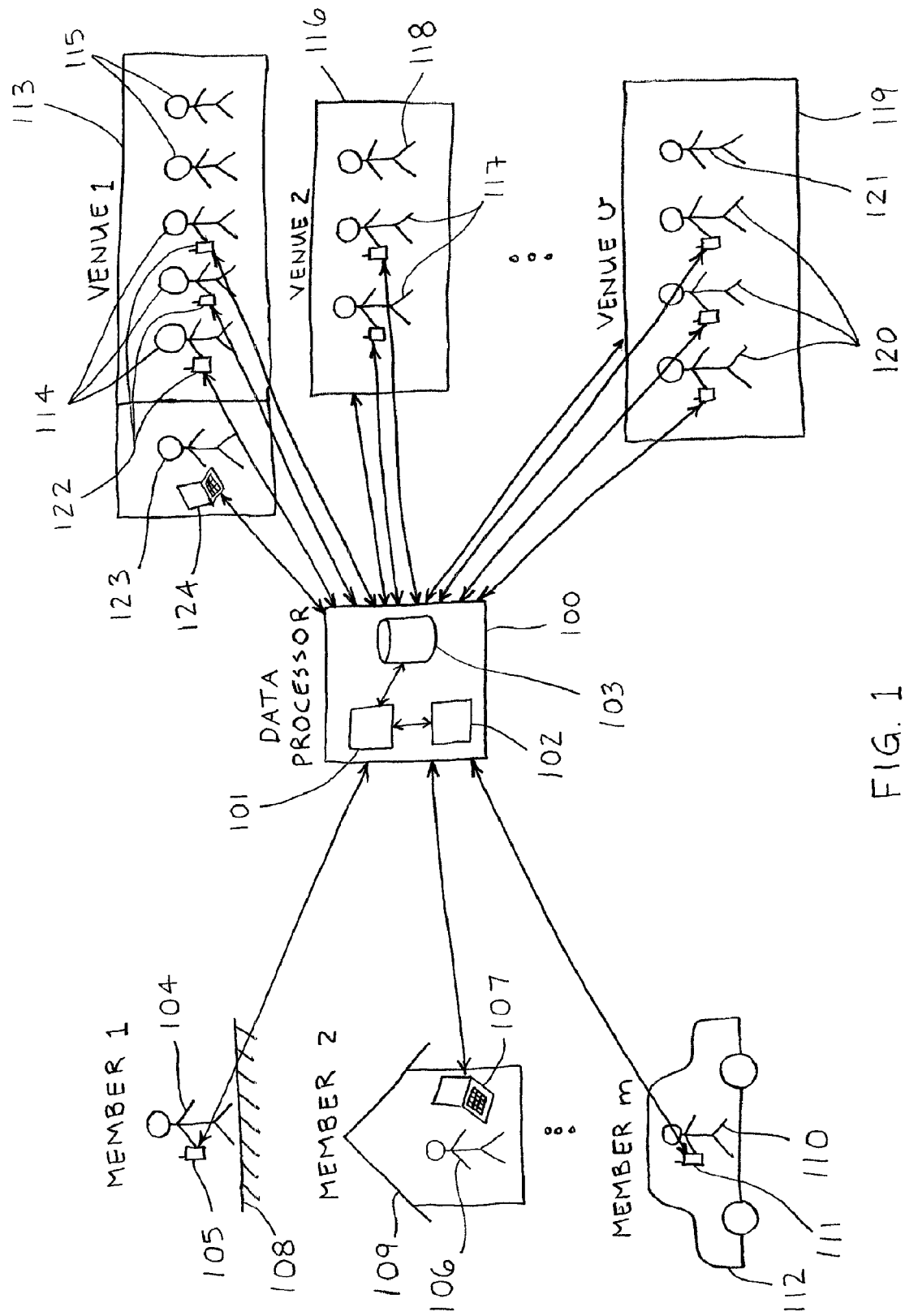
FIG. 1 is a diagrammatic view of the Hoozware system, including members, venues and a data processor.

A system and method is provided for a service to venues where people aggregate.

The subject invention is further described in detail hereunder referring to the embodiments provided in the drawings.

FIG. 1 is a diagrammatical view of the Hoozware system showing various entities communicating with a data processor 100. The data processor 100 comprises a processor 101, such as a central processing unit (CPU), computer memory 102 and a database 103 typically stored on a hard drive accessible by the processor 101. The data processor 100 may comprise a computer server, desktop computer, laptop computer, portable computer or any other convenient computing device or combination of distributed or networked computing and/or data communication devices. The database 103 may be a single database or may be multiple databases that may reside on a single hard drive or multiple hard drives accessible over a network, where the network may be wired or wireless. The database 103 may comprise a dating service database. Such a dating service database may exist at a remote site and be licensed from a Hoozware vendor partner.

The data processor 100 communicates, both wired and wirelessly, with various entities, including members, venues and sponsors. The data processor 100 can communicate wirelessly with a Hoozware Member1 104 who is using a data communication device 105. The data communication device may be a mobile phone (a.k.a. mobile telephone, cellular telephone, cell phone) or handheld computer. By "handheld computer" is meant a relatively small wired, wireless or mobile computer, terminal or PDA ("personal digital assistant"), such as a Palm Pilot®, Pocket PC®, Blackberry®, and the like. The Member1 104 may be standing on the ground 108, sitting, walking, running, etc., or be most anywhere where they can send and receive signals. A Member2 106 may communicate with the Hoozware system data processor 100 from a building 109, such as their home or office, using a wired or wireless computer 107. The computer 107 may be a laptop computer, desktop computer, mobile phone, handheld computer and the like. A MemberM 110 may communicate with the Hoozware system data processor 100 from a vehicle 112, such as a car, bus, train, subway, people mover, aircraft, watercraft, and the like. Typically, the MemberM 110 communicates with the Hoozware system using a mobile phone 111; however, depending on whether the vehicle has wired communication capability, the MemberM 110 may use other wireless or wired communication devices, including handheld computers, wireless computers, wired computers, wired telephones, cordless telephones and the like.

The data processor 100 is also capable of communicating with venues and members and non-members at venues. The data processor 100 communicates with Venue1 113 by both wired and wireless communication devices. For example, a venue manager 123 may communicate with the data processor 100 from his office using a wired desktop computer 124. The manager 123 may also communicate with the data processor 100 using a mobile phone. The data processor communicates with members 114 at Venue1 113 typically by their data communication devices 122. In FIG. 1, members are shown having data communication devices that are depicted similarly to the data communication device 105. Non-members 115 at Venue1 113 are not depicted in FIG. 1 to have data communication devices; however, they may have them. The non-members 115 typically have limited access to information that the data processor 100 provides to the members 114.

Typically, the data communication devices 122 comprise position-sensing devices, such as global positioning system (GPS) sensors. Any other convenient position-sensing device may be used. Assuming a member is in possession of such a data communication device, the location information provided by the GPS sensor is assumed to indicate the location information for the member. The data processor 100 typically receives location information from the data communication devices 122 of members 114. Accordingly, at Venue1 113, three of the five people present are tracked and known to be at Venue1 113. For the tracked members 114 the data processor also knows their traits and can calculate demographics of members 114 at Venue1 113 and also estimate the demographics of the entire crowd based on a previously estimated relationship between member demographics and entire crowd demographics.

The venue manager 123 at Venue1 113 typically can view information provided by the data processor 100 concerning the members 114 at Venue1 113, as well as, view information about the members 117 and 120 at other venues 116 and 119, respectively. A non-member 118 is at Venue2 116 and a non-member 121 is at VenueV 119. The data processor 100 typically provides such information concerning members to a Hoozware website, where the manager 123 views it using a browser or custom software application running on his office computer 124. The venue manager 123 at Venue1 113 may use such viewed information to decide to send promotional material to a desired number of members making up a demographic of interest or exhibiting a behavior of interest to the manager 123. For example, the manager 123 at Venue1 113 may decide at 10:00 p.m. that business is a little slow and so he wants to entice members to come to Venue1 113. The manager 123 can use either a browser or custom software application running on his office computer 124 to submit a request to send promotional material. In one illustrative embodiment, the manager 123 may use a series of drop-down boxes, number-entry boxes, radio buttons, and the like, to submit his request to the data processor 100. For example, the manager 123 may use drop-down boxes to select a first demographic group comprising women between the ages of 25 and 29. The manager 123 may then use a number-entry box to enter the desired number of members to which promotional material is sent. For example, the manager 123 may enter the number "25." In the illustrative embodiment, the manager 123 then selects from a set of radio buttons which promotional materials are to be sent to his selected demographic. For example, the manager 123 selects his promotional material to comprise an offer for "No Cover Charge." In the illustrative embodiment, the manager 123 then selects from the drop-down boxes a second demographic group comprising men between the ages of 25 and 34; clicks a radio button that the promotional material is to be sent to "All In The Selected Demographic Not At Venue1;" and selects from a set of radio buttons that the promotional material comprise a "2 for 1" drink offer if redeemed within 30 minutes. The manager 123 then clicks a "Preview" button which summarizes the promotional material, to whom it is to be sent, the associated cost of the promotion to be paid to Hoozware, and is then presented with "Send," "Cancel" and "Back" buttons. If Send is pressed, the data processor 100 follows the manager's instructions and sends the promotional materials to the mobile phones (e.g., using SMS text messages) and/or email addresses of members fitting the desired demographics. The promotional materials may also be stored for members on the Hoozware data processor 100 in a location accessible by the members using any of a variety of wireless and wired communication devices.

In the illustrative embodiment above, selecting "All In The Selected Demographic Group Not At Venue1" means that the promotional material will go to all members fitting the selected demographics, including the mobile phones of members at other venues. In fact, the Hoozware system typically allows a venue manager to specifically request that promotional materials be sent to members exhibiting a particular behavior. Some example behaviors include (a) the venue you're at now, (b) venues you frequent, (c) where you park before going to a venue, (d) where you eat before going to a venue, (e) the path you take in going to a venue, (f) how much you drink at a venue, (g) how much you spend at a venue, (h) which types of promotional materials you accept, (i) what types of products you buy, and the like. Accordingly, in the illustrative example above, the manager 123 at Venue1 113 might intentionally try to encourage members at other venues to come to his venue by selecting from a drop-down box that his promotional material be sent to members 117 exhibiting the behavior that they are presently at Venue2 116. The manager 123 may select that the promotional materials sent to this selected group of members further include "No Cover Charge" since it is likely that such members already paid a cover charge at the competing Venue2 116. Venue2 116 may also send promotional material to its members in attendance to encourage them to stay. In a sense, the Hoozware system can be used like an "eBay® for people," where venues, in effect, bid for members in real time.

Figure 2A:
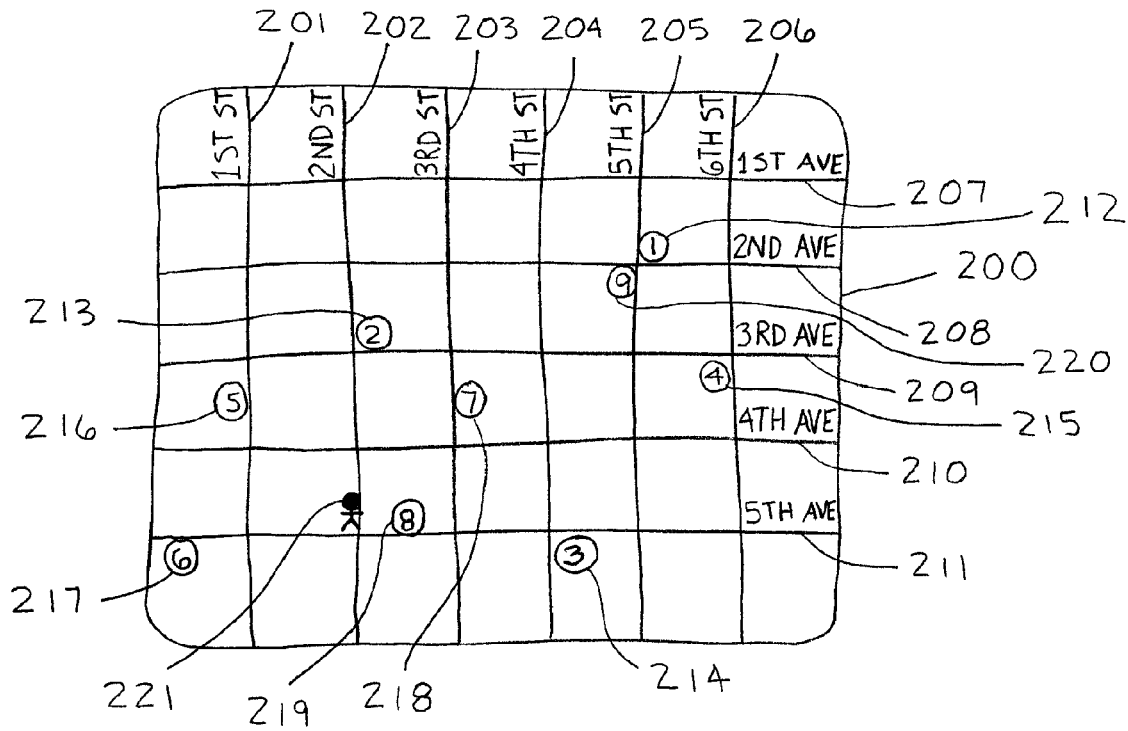
FIG. 2A is a map view of venue search results.

FIG. 2A is a graphical map display 200 that may be used in an exemplary embodiment to display venue search results on the screen of a mobile phone which is in "map mode." The map shows streets and venues. Example streets include $1^{st}$ Street 201, $2^{nd}$ Street 202, $3^{rd}$ Street 203, $4^{th}$ Street 204, $5^{th}$ Street 205, $6^{th}$ Street 206, $1^{st}$ Avenue 207, 2nd Avenue 208, $3^{rd}$ Avenue 209, $4^{th}$ Avenue 210 and $5^{th}$ Avenue 211. VenueA 212 is shown on the northeast corner of $5^{th}$ Street 205 and $2^{nd}$ Avenue 208; VenueB 213 is shown on the northeast corner of $2^{nd}$ Street 202 and $3^{rd}$ Avenue 209; VenueC 214 is shown on the southeast corner of $4^{th}$ Street 204 and $5^{th}$ Avenue 211; VenueD 215 is shown on the southwest corner of $6^{th}$ Street 206 and $3^{rd}$ Avenue 209; VenueE 216 is shown on the west side of $1^{st}$ Street 201 midblock between $3^{rd}$ Avenue 209 and $4^{th}$ Avenue 210; VenueF 217 is shown on the south side of $5^{th}$ Avenue 211 west of $1^{st}$ Street 201; VenueG 218 is shown on the east side of $3^{rd}$ Street 203 midblock between $3^{rd}$ Avenue 209 and $4^{th}$ Avenue 210; VenueH 219 is shown on the north side of $5^{th}$ Avenue 211 midblock between $2^{nd}$ Street 202 and $3^{rd}$ Street 203; and Venue1 220 is shown on the southwest corner of $5^{th}$ Street 205 and $2^{nd}$ Avenue 208. In this example, the venues are designated on the map by a circle with an associated number, where the number specifies the venue's ranking score based on the member's predefined rankings of individual venue characteristics and attendee demographics. The member's location is depicted by the person icon 221 at the northwest corner of $2^{nd}$ Street 202 and $5^{th}$ Avenue 211. The location is determined by position sensing, such as GPS, in the member's mobile communication device.

Typically, various mobile phone controls are used to control the translation and zoom of the map. Mobile phone controls are also typically used to select a venue and request more information about the venue. For example to further illustrate, after selecting the map mode by toggling between "map mode" and "text mode" using the * key, the VenueA 212 is highlighted by default since it received the highest ranking score. To highlight a subsequent venue, the mobile phone "down arrow" is used; then to highlight a venue above, the mobile phone "up arrow" is used. Once a venue is highlighted for which the member desires more information, such as detailed information on the highlighted venue's characteristics and attendee demographics, the "OK" button on the mobile phone is pressed. If the mobile phone has a touch screen, the member may simply tap the circle designating the venue to bring up detailed information on the corresponding venue.

Figure 2B:
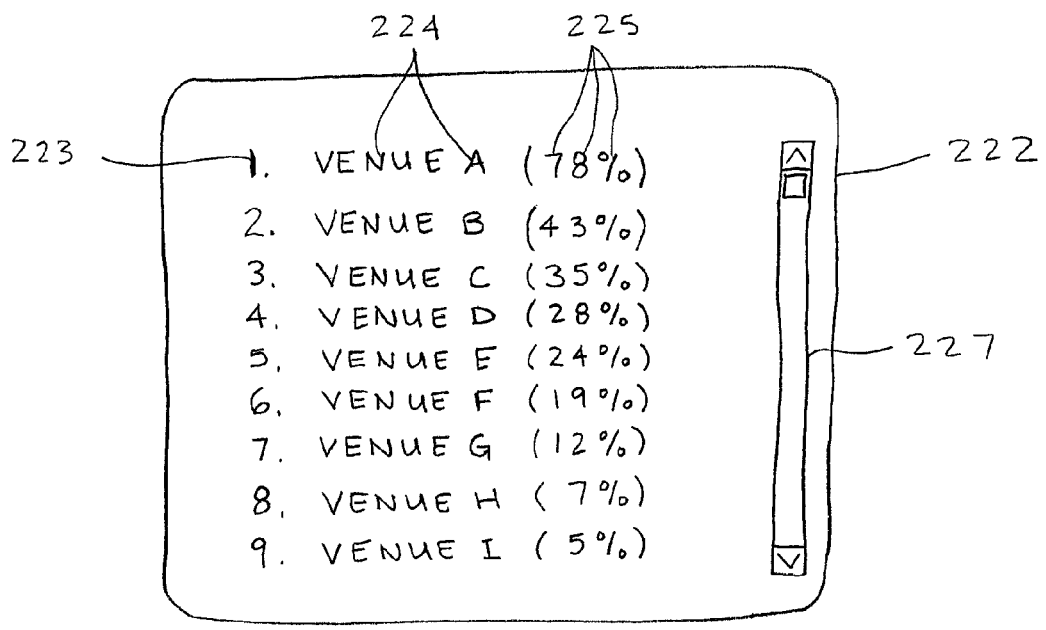
FIG. 2B is a text view of venue search results.

FIG. 2B is a text display 222 that may be used in an exemplary embodiment to display venue search results on the screen of a mobile phone when in "text mode." In this embodiment, the text display 222 lists the venues returned by a Hoozware venue search. The text display 222 lists the venue, VenueA 224, with the highest ranking score at the top next to ranking index 1 223 and with a ranking score of 78% 225 listed next to it on the other side. In the example, the other venues are listed below VenueA 224 next to their associated ranking index and ranking score. Typically, the text display 222 has a graphical scroll bar 227 when there are too many venue results to fit on a single screen.

Continuing with this exemplary embodiment, to toggle from the map display 200 to the text display 222 the member may again use the * key. Similar to the map mode, the VenueA 212 is highlighted by default since it received the highest ranking score. To highlight a subsequent venue in the text list, the mobile phone "down arrow" is used; then to highlight a venue above, the mobile phone "up arrow" is used. Once a venue is highlighted for which the member desires more information, such as detailed information on the highlighted venue's characteristics and attendee demographics, the "OK" button on the mobile phone is pressed. If the mobile phone has a touch screen, the member may simply tap the name of the venue to bring up detailed information on it.

Figure 3:
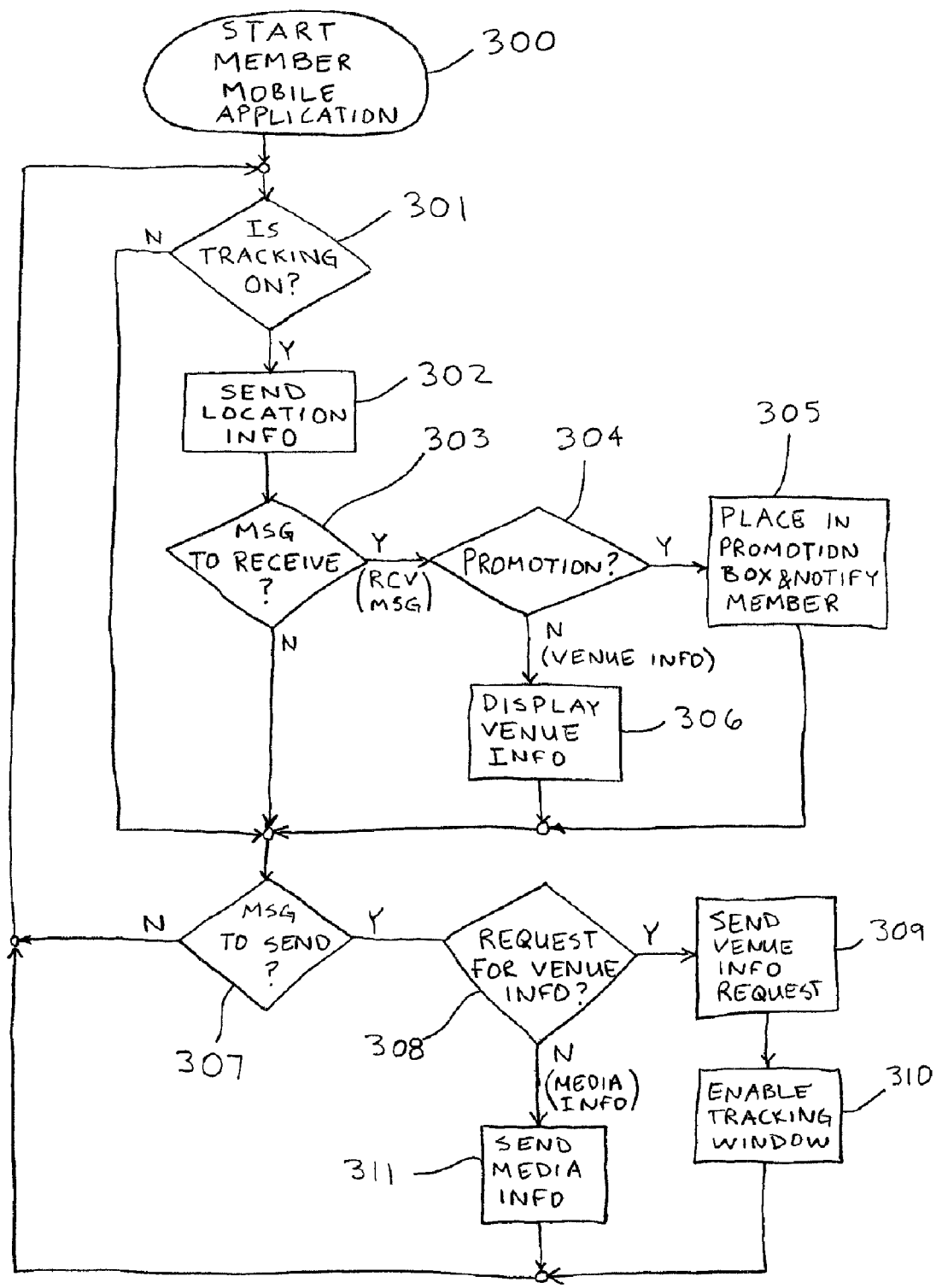
FIG. 3 is a simplified logic flow diagram for a software application accessed using a member's mobile communication device.

FIG. 3 is a simplified logic flow diagram for a software Hoozware mobile application which may be accessed by, or run on, a member's mobile phone. FIG. 3 exemplifies basic elements; although, other features may be added to a commercial Hoozware mobile application. Such an application is typically downloaded to the member's mobile phone from the Hoozware website, the member's carrier's website, a third-party mobile phone software website or by downloading the application from a CD to the member's computer and then transferring the application to the member's mobile phone. The Hoozware mobile application may also run on the Hoozware system server 100 and be accessed, such as by a web browser, using a mobile phone (typically using a WAP browser), other data terminal, an office computer, communication device and the like.

In an illustrative embodiment, the Hoozware mobile application is loaded onto the member's mobile phone and launched, i.e., started 300. Once the application is launched it runs as a background process until terminated by the member. Typically, even if the mobile phone is turned off, if the application had not been explicitly terminated by the member prior to turning off the mobile phone, the application will automatically launch when the mobile phone is turned on.

During the process of loading and launching the Hoozware mobile application, the member is asked to set up the application. During setup, the member is typically asked to configure, define or edit the following application features: (1) tracking window(s), (2) moods, (3) personal profile, including traits, nickname, personal statement, self photo, etc., (4) register with Hoozware, (5) friends and groups, etc.

The Hoozware mobile application performs a number of important functions. Such functions include: (1) checking and handling tracking, (2) processing received messages and (3) processing messages to send. Each function may be a separate process and processed in parallel or sequentially. Each process may be a separate thread. In the Hoozware mobile application embodiment of FIG. 3, the functions are processed sequentially.

While it is running, the Hoozware mobile application checks 301 whether "tracking" is enabled for the member's mobile phone. Most mobile phones have position tracking capability, such as GPS, which can be used to determine the geographical location of the phone, and hence, the member. If tracking is enabled the mobile phone automatically transmits 302 the location information of the mobile phone to the Hoozware system server 100. Transmission of the location information may use any convenient method, including an SMS message, email, telephone call and the like. If tracking is not enabled, in the embodiment as shown, the member is prohibited from receiving promotions and viewing certain venue information.

Next, the Hoozware mobile application checks 303 whether there is a message to receive and process. If so, the application receives the message and checks 304 to see if it is promoter (i.e., venue or sponsor) promotional material. If so, the promotional material is provided to, or made accessible by, the member. In the embodiment of FIG. 3, the promotional material is placed 305 in a special promotional material message box on the member's mobile phone. If there are no other un-read promotional materials in the member's promotional materials message box the member is notified that there is new promotional material available. In the embodiment of FIG. 3, the member can configure how they wish to be notified of such new promotional material. Typical notification methods include visual, auditory and tactile signals.

If the message is not promotional material, in the embodiment of FIG. 3 the message is assumed to be venue information which was previously requested by the member. In an embodiment not shown here, the Hoozware mobile application checks the message to confirm that the received information is venue information. The venue information is displayed 306 on the member's mobile phone, such as provided by the examples of FIGS. 2A and 2B.

Next, the Hoozware mobile application checks 307 whether the member has requested to send a message. This check 307 is also done next if it was determined 301 that tracking was not enabled. If the member has requested to send a message a check 308 is done to see if the request is for venue information. If so, the member's current "mood" is submitted 309 to the Hoozware system server 100 along with a request for a list of venues best matching the demographics and characteristics defined by the member's mood. If the member was not being tracked at the time of this venue information request, tracking will be enabled 310 on their mobile phone for a period of time. A typical period of time is until the end of the current predefined tracking window.

If it was determined 308 that the member's request was not for venue information, in the embodiment of FIG. 3 the request is assumed to be to send media information, so media is sent 311. In an embodiment not shown here, the Hoozware mobile application checks the request to confirm that it is to send media information. Media information sent by the member typically includes text, audio (including audio recordings of the crowd, music/band and voice annotated member comments), images and/or video, and may be sent in any convenient format, including SMS, MMS, email, a phone call, and the like. In one embodiment, if the member enters text into their mobile phone, uses their mobile phone to record sound, take a picture or record video, the Hoozware mobile application will infer that the member wishes to post characteristic information about a venue and so the Hoozware mobile application will prompt the member to submit such media to the Hoozware system server 100.

At this point, as well as if it had been determined 307 that the member was not requesting to send a message, control is returned to the beginning where the Hoozware mobile application checks 301 whether tracking is enabled.

Figure 4:
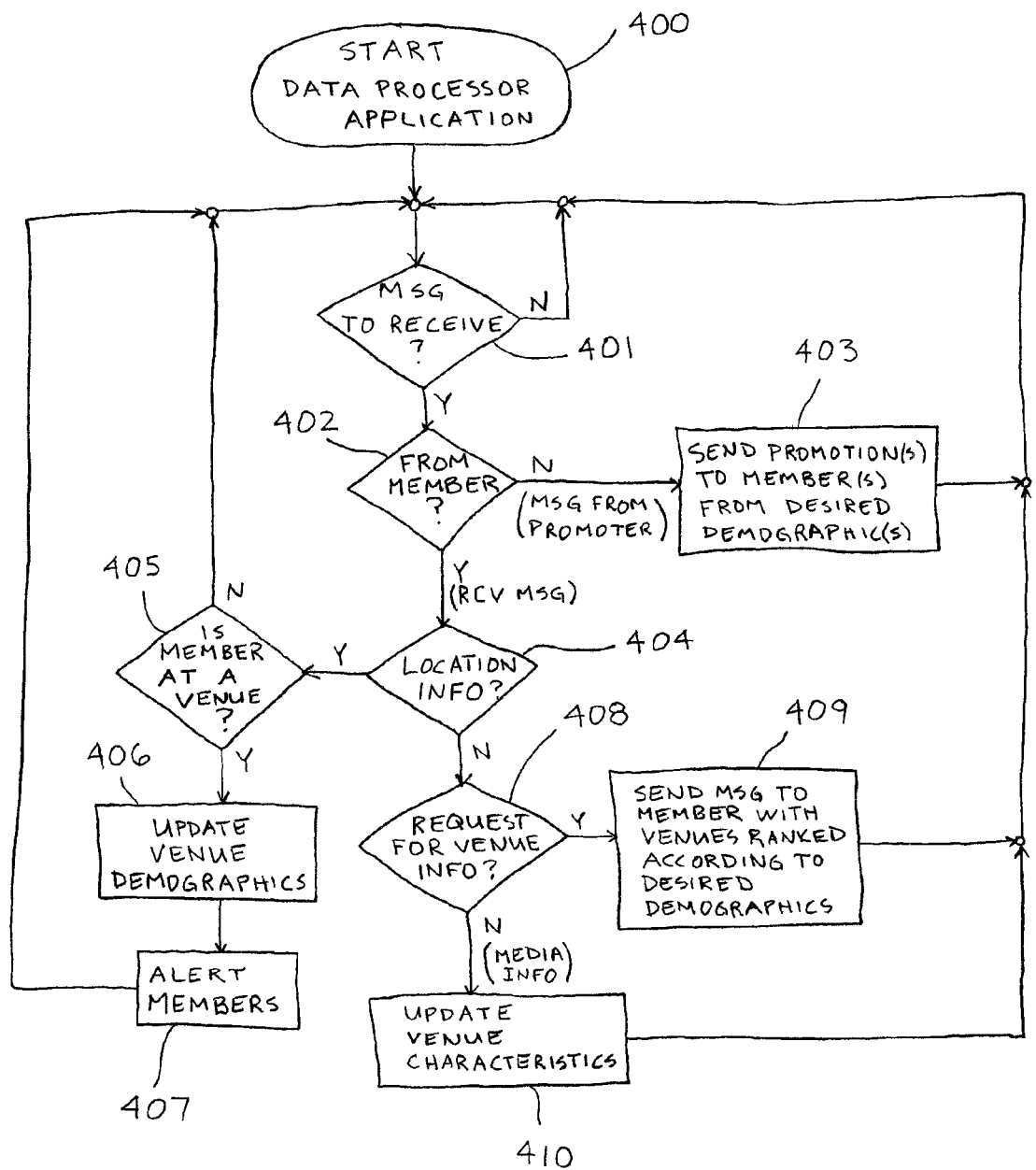
FIG. 4 is a simplified logic flow diagram for a software application to run on the Hoozware data processor.

FIG. 4 is a simplified logic flow diagram for a software Hoozware system server application which may run on the Hoozware system server, a.k.a. data processor 100. FIG. 4 exemplifies basic elements; although, other features may be added to a commercial Hoozware system server application. The Hoozware system server application performs a number of important functions. Such functions include: (1) receiving and processing messages from members, (2) receiving and processing messages from promoters and (3) storing member traits, venue demographics and venue characteristics. Each function may be a separate process and processed in parallel or sequentially. Each process may be a separate thread. In the Hoozware system server application embodiment of FIG. 4, the functions are processed sequentially.

Once the Hoozware system server application is loaded onto the Hoozware system server and started 400 it checks 401 whether there is a message to receive. If not, the application continues to check 401 until there is a message to receive. Once there is a message to receive, the Hoozware system server application checks 402 whether the message is from a member. If not, in the simple embodiment of FIG. 4 the Hoozware system server application assumes the message is from a promoter. In an embodiment not shown here, the Hoozware system server application checks the message to confirm that it is from a promoter.

A promoter message typically includes promotional material and instructions regarding to which members the promotional material is to be sent. Such instructions typically include demographics and behaviors that members must possess to receive the promotional material. Optionally, such instructions further include the maximum number of members to which the promotional material is to be sent. Optionally, such instructions further include specific members, typically referred to anonymously by a member identifier, to which the promotional material is to be sent. Promotional materials typically comprise drink specials, cover charge discounts, access to VIP lounges, transportation offers, parking specials, food specials, merchandise offers, lodging specials, music downloads, passes to other events, retail gift cards, and the like. The message is sent 403 to, or made accessible by, one or more members by the Hoozware system server 100 following the promoter's instructions. At this point, control is returned to checking 401 whether there is a message to receive.

A promotion may be redeemed by the receiving member in a variety of ways, including showing the promoter's agent the promotional material displayed the member's mobile phone, where such promotional material typically includes an offer identifier. The promoter's agent is anyone permitted by the promoter to provide to the redeeming member the goods and/or services promoted by the promotional material. The redeeming member may be required to show the promoter's agent the member's personal-field photo on their mobile phone, or other identification, to confirm that they are the intended member for the promotional material. The member may receive rewards points for accepting the promotional material. For more discussion on rewards, refer to the previous details of one embodiment of the subject invention in Section 3.2 covering an example Rewards Program.

If the check 402 regarding whether the message to be received is from a member is true, the message is received and queried 404 to see if it contains location information of the member's mobile phone (a.k.a. mobile communication device). If so, in the embodiment of FIG. 4 the Hoozware system server 100 predicts 405 whether the member is at a particular venue. If so, the member's traits are combined with the traits of other members estimated to be at the venue to provide 406 demographics for the venue. In the embodiment of FIG. 4, other members may be alerted 407 to the change in venue demographics. Typically, a member will receive such an alert 407 only if they have requested to be alerted if a demographic of interest to them has moved above or below a predefined level, or if a member of interest, such as a friend or group member, has arrived at or left the venue. At this point, control is returned to checking 401 whether there is a message to receive.

If the message that is received and queried 404 does not contain location information the message is queried 408 to see if it contains a request for venue information. If so, the message contains the sending member's "mood" and/or associated desired demographics and venue characteristics with weighting factors. The Hoozware system server 100 processes the desired demographics and venue characteristics with weighting factors to determine the ranked list of venues that best matches the member's desires. Typically, such a ranked list of venues includes a measure of how close each listed venue matches the member's defined mood. The ranked list of venues and measures of match are sent 409 typically to the member's mobile phone and/or home computer. At this point, control is returned to checking 401 whether there is a message to receive.

If the message is queried 408 and does not contain a request for venue information, in the embodiment of FIG. 4 the message is assumed to contain media information. In an embodiment not shown here, the Hoozware system server application checks the message to confirm that it contains media information. The media information in the message is added 410 to the database 103 that the Hoozware system server 100 accesses. The media information is added 410 to the section of the database 103 for the venue the media pertains to. At this point, control is returned to checking 401 whether there is a message to receive.

Figure 5:
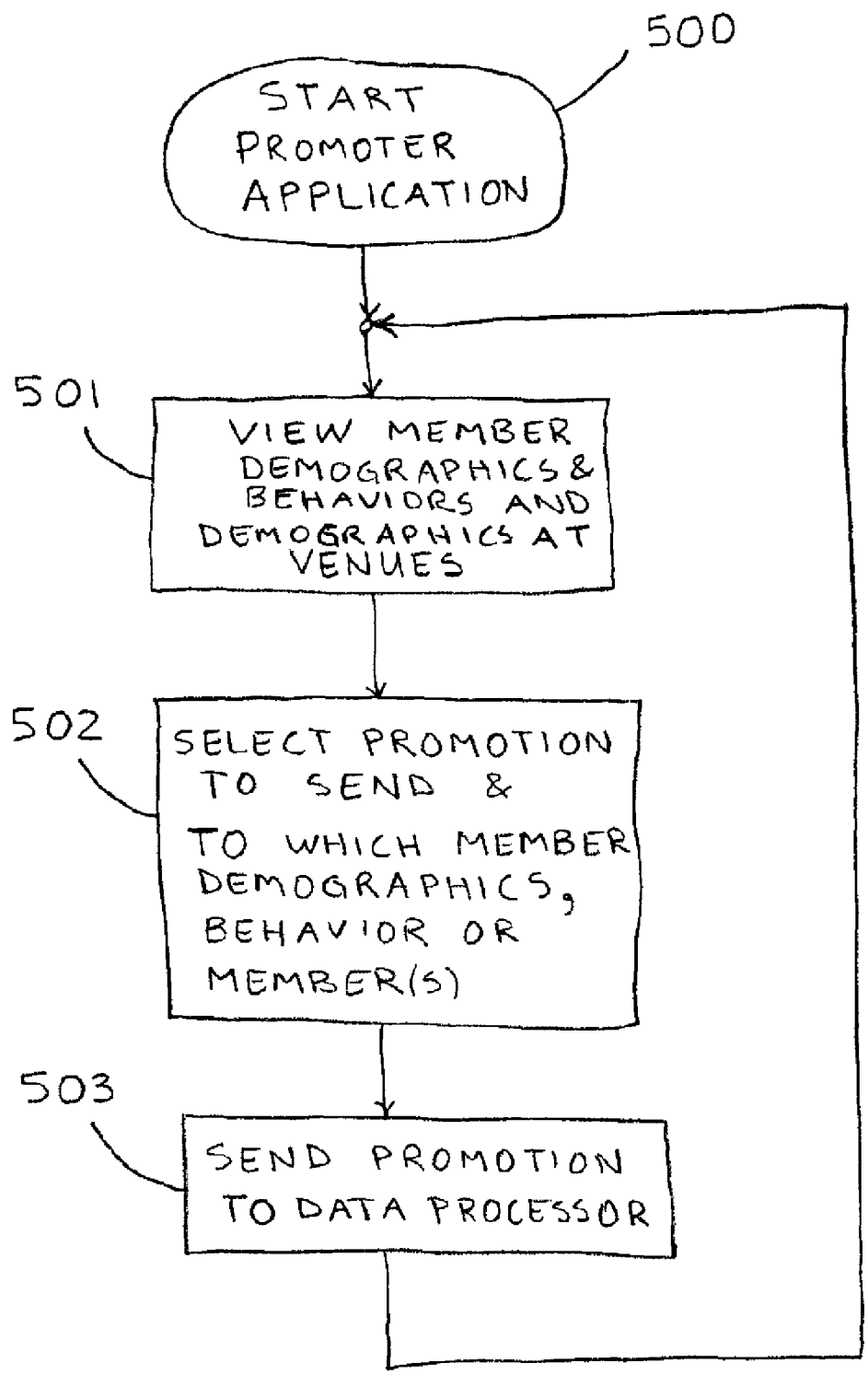
FIG. 5 is a simplified logic flow diagram for a software application accessed using a promoter's office computer.

FIG. 5 is a simplified logic flow diagram for a software Hoozware promoter application which may be accessed by, or run on, a promoter's office computer. FIG. 5 exemplifies basic elements; although, other features may be added to a commercial Hoozware promoter application. Such an application is typically downloaded to the promoter's office computer (or alternately, to a mobile phone, other data terminal, etc.) from the Hoozware website or by loading the application from a CD to the promoter's computer. The Hoozware promoter application may also run on the Hoozware system server 100 and be accessed, such as by a web browser, using an office computer, mobile phone, other data terminal, communication device and the like. The Hoozware promoter application performs a number of important functions. Such functions include: (1) receiving member demographics and behaviors, (2) receiving member demographics at venues, (3) selecting promotions and specifying instructions regarding to which member the promotions should go, and (4) sending the promotion and instructions to the Hoozware system server 100. Each function may be a separate process and processed in parallel or sequentially. Each process may be a separate thread. In the Hoozware promoter application embodiment of FIG. 5, the functions are processed sequentially.

Once the Hoozware promoter application is loaded onto the promoter's computer, or accessed by a web browser, and started 500 it allows the promoter to continually view 501 the demographics and behaviors of members in the Hoozware system. In the embodiment of FIG. 5, the Hoozware promoter application allows the promoter to also view the demographics at one or more venues.

The Hoozware promoter application allows the promoter to select 502 promotional materials to send or post, and to specify instructions regarding which members to send to, or make accessible, the promotional materials. The Hoozware promoter application also allows the promoter to send 503 the promotional materials and instructions to the Hoozware system server 100, which then sends to, or makes accessible, the promotional materials to members according to the instructions.

Figure 6:
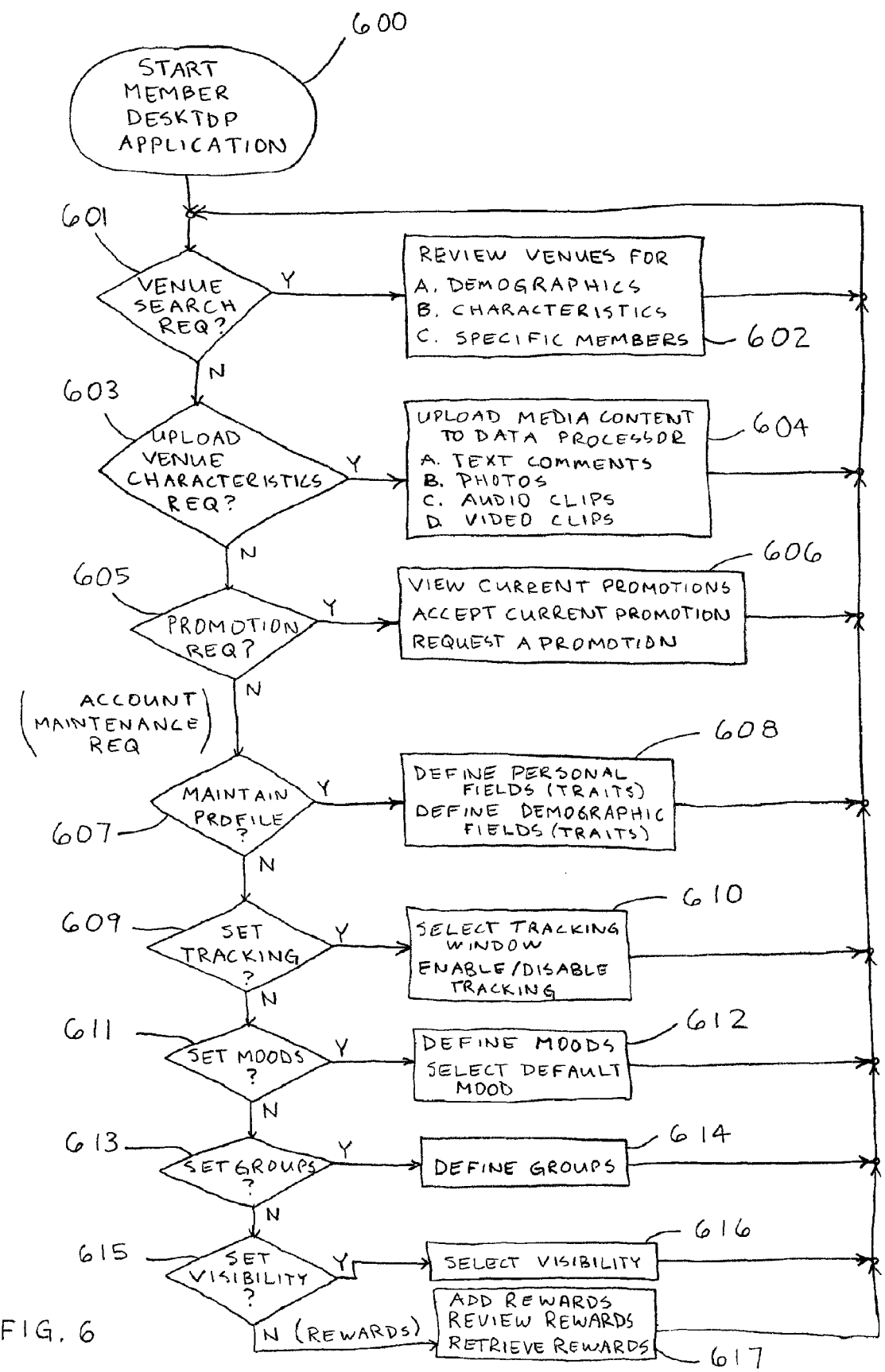
FIG. 6 is a simplified logic flow diagram for a software application accessed using a member's home computer.

FIG. 6 is a simplified logic flow diagram for a software Hoozware member's home application which may be accessed by, or run on, a member's home computer. FIG. 6 exemplifies basic elements; although, other features may be added to a commercial Hoozware member's home application. Typically, the member's mobile application (FIG. 3) and the member's home application (FIG. 6) are similar. In fact, typically, the member's mobile application provides a subset of functionality of the member's home application. The member's home application is typically downloaded to the member's home computer from the Hoozware website or by loading the application from a CD to the member's computer. The Hoozware member's home application may also run on the Hoozware system server 100 and be accessed, such as by a web browser, using a home computer, mobile phone, other data terminal, communication device and the like. The Hoozware member's home application performs a number of important functions. Such functions include: (1) viewing venue demographics and characteristics, and determine which friends and groups are at which venues, (2) uploading media content concerning venue characteristics to the Hoozware system server 100, (3) viewing, redeeming or requesting a promotion, (4) defining and editing personal traits and related information, (5) selecting a tracking window and enabling/disabling tracking, (6) defining and editing moods, (7) defining friends and groups, (8) specifying visibility to others and (9) reviewing, adding and/or redeeming rewards. Each function may be a separate process and processed in parallel or sequentially. Each process may be a separate thread. In the Hoozware member's home application embodiment of FIG. 6, the functions are processed sequentially.

Once the Hoozware member's home application is loaded onto the member's home computer, or accessed by a web browser, and started 600 it checks 601 to see if the member has requested a venue search. If so, the member's "mood" and/or associated desired demographics and venue characteristics with weighting factors are sent to the Hoozware system server 100. The Hoozware system server 100 processes the desired demographics and venue characteristics with weighting factors to determine the ranked list of venues that best matches the member's desires. Typically, such a ranked list of venues includes a measure of how close each listed venue matches the member's defined mood. In the embodiment of FIG. 6, the ranked list of venues and measures of match are sent to the member's home computer for viewing 602. At this point, in the embodiment of FIG. 6, control is returned to checking 601 to see if the member has requested a venue search.

If the member has not requested a venue search, in the embodiment of FIG. 6 the Hoozware member's home application checks 603 to see if the member has requested to upload media content. If so, the member is provided with functionality to conveniently upload 604 to the Hoozware system server 100 text comments, voice annotations, photos, recorded audio and video clips from a venue, and the like. The media is stored in the portion of the database 103 for the corresponding venue. At this point, in the embodiment of FIG. 6, control is returned to checking 601 to see if the member has requested a venue search.

If the member has not requested to upload media content, in the embodiment of FIG. 6 the Hoozware member's home application checks 605 to see if the member has requested to access promotions. If so, the member is provided with functionality to conveniently access promotions relevant to the member. Such promotions may be stored and accessed from the Hoozware system server 100 or stored locally on the member's home computer. The member may view promotions 606 currently relevant to the member, redeem such promotions or request that a promotion be offered to the member. At this point, in the embodiment of FIG. 6, control is returned to checking 601 to see if the member has requested a venue search.

If the member has not requested to access promotions, in the embodiment of FIG. 6 the Hoozware member's home application checks 607 to see if the member has requested to maintain their member profile. If so, the member is provided with functionality to conveniently maintain their member profile. Such member profile information is typically stored on the Hoozware system server 100 or stored locally on the member's home computer. The member may define 608, edit or view their member profile. The member profile typically includes personal traits that are combined with traits of other members to produce member demographics. Such traits typically comprise: age, sex, sexual orientation and preference, education, race, religion, smoker/non-smoker, marital status (e.g., single/married/committed/divorced), parental status, financial status, occupation, home zip code, political affiliation, pictures, both direct and anonymous contact information, friend status, group status, as well as other online dating categories including physical attributes (e.g., height, weight, eye color, hair color, balding, body type, attractiveness, etc.), etc. There may be several attractiveness trait categories, including self rated, member rated, Hoozware rated, venue rated, etc. At this point, in the embodiment of FIG. 6, control is returned to checking 601 to see if the member has requested a venue search.

If the member has not requested to maintain their member profile, in the embodiment of FIG. 6 the Hoozware member's home application checks 609 to see if the member has requested to set tracking parameters. If so, the member is provided with functionality to conveniently set tracking parameters 610. Such functionality typically allows the member to select a tracking window. Tracking windows are predefined periods of time in which a member's location is automatically transmitted from their mobile phone to the Hoozware system server 100. Setting tracking parameters 610 also include the ability to enable or disable tracking, regardless of the tracking window selected. At this point, in the embodiment of FIG. 6, control is returned to checking 601 to see if the member has requested a venue search.

If the member has not requested to set tracking parameters, in the embodiment of FIG. 6 the Hoozware member's home application checks 611 to see if the member has requested to define moods. If so, the member is provided with functionality to conveniently define, edit, view and select moods 612. Mood definitions may be stored in the database 103 on the Hoozware system server 100 and/or on the member's home computer and/or the member's mobile communication device. Mood definitions include the name of the mood and the associated desired demographics and venue characteristics with weighting factors. At any time there is a default mood in effect that is used by the Hoozware system server 100 when a request is received by the member for a venue search; however, a new default mood may be selected at any time using either the Hoozware member's home application or mobile application. At this point, in the embodiment of FIG. 6, control is returned to checking 601 to see if the member has requested a venue search.

If the member has not requested to define moods, in the embodiment of FIG. 6 the Hoozware member's home application checks 613 to see if the member has requested to define friends and/or groups. If so, the member is provided with functionality to conveniently define, edit, view and select friends and groups 614. Friend and group definitions may be stored in the database 103 on the Hoozware system server 100 and/or on the member's home computer and/or the member's mobile communication device. Friend definitions include the name of the friend. Group definitions include the name of the group, the group leader and the associated group members. Friend status and group status may be included by a member as parameters of interest in a venue search request. At this point, in the embodiment of FIG. 6, control is returned to checking 601 to see if the member has requested a venue search.

If the member has not requested to define friends and/or groups, in the embodiment of FIG. 6 the Hoozware member's home application checks 615 to see if the member has requested to set their visibility to others. If so, the member is provided with functionality to conveniently define, edit, view and select visibility 616. Visibility settings may be stored in the database 103 on the Hoozware system server 100 and/or on the member's home computer and/or the member's mobile communication device. A member may allow various entities to view certain personal information. Typical entities comprise: all members, a subset of members (such as friends and/or groups), venues and sponsors. Personal information that a member can typically restrict visibility to comprises any of their personal traits, such as: age, sex, sexual orientation and preference, education, race, religion, smoker/non-smoker, marital status (e.g., single/married/committed/divorced), parental status, financial status, occupation, home zip code, political affiliation, pictures, both direct and anonymous contact information, friend status, group status, as well as other online dating categories including physical attributes (e.g., height, weight, eye color, hair color, balding, body type, attractiveness, etc.), etc. There may be several attractiveness trait categories, including self rated, member rated, Hoozware rated, venue rated, etc. A typical visibility setting for a first member is that a second member cannot view any trait of the first member if the second member doesn't allow the first member to view the same trait of the second member. At this point, in the embodiment of FIG. 6, control is returned to checking 601 to see if the member has requested a venue search.

If the member has not requested to set their visibility to others, in the embodiment of FIG. 6 the Hoozware member's home application assumes that the member wishes to access rewards. If so, the member is provided with functionality to conveniently enter items that provide reward points 617, review the member's current number of reward points and/or redeem goods and/or services using the member's points. Reward information may be stored in the database 103 on the Hoozware system server 100 and/or on the member's home computer and/or the member's mobile communication device. For discussion on how a member may receive rewards points for accepting the promotional material, refer to the previous details of one embodiment of the subject invention in Section 3.2 covering an example Rewards Program. The member typically may use their rewards point to receive goods and/or services. Such goods and/or services typically comprise: drink specials, cover charge discounts, access to VIP lounges, transportation offers, parking specials, food specials, merchandise offers, lodging specials, music downloads, passes to other events, retail gift cards, and the like. At this point, in the embodiment of FIG. 6, control is returned to checking 601 to see if the member has requested a venue search.

Figure 7:
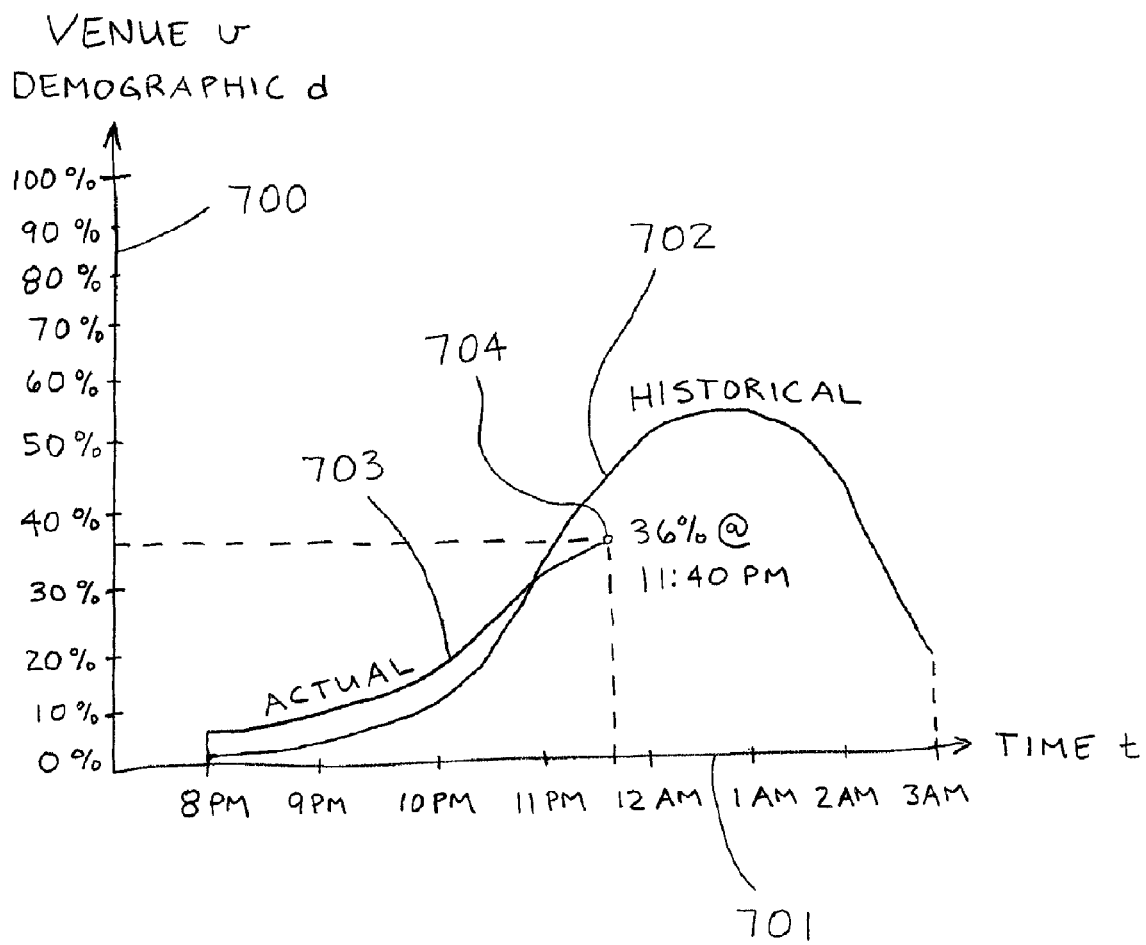
FIG. 7 is an example plot of one demographic versus time on a particular evening at one venue, where the historical average for the selected demographic is plotted along with the actual real-time demographic.

FIG. 7 is a graph exemplifying how demographics information at a venue may be presented to a member, venue or sponsor, for viewing on a mobile phone, data terminal, home or office computer screen, and the like. In this example, the ordinate ("Y axis") 700 represents the demographics d at venue v, such as, the percentage of members at venue v that possess trait d. The abscissa ("X axis") 701 represents the time t. FIG. 7 shows an historical curve 702 that represents a function of previous nights where the demographic d for venue v were recorded over time. Also in FIG. 7 is a curve showing the actual 703 recorded demographics d for venue v up to the point 704 corresponding to the present time of 11:40 p.m., where the demographics d denote that 36% of the crowd possess trait d.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A system for providing a service to venues where people aggregate, said system comprising members associated with an organization for processing and transmitting information to said venues, said members or non-members, said members having mobile communication devices, said system comprising:
   a data processor, said data processor:
      receiving real-time data comprising information about attendees from a mobile communication device of at least one member presently at a venue;
      processing said real-time data to provide processed data comprising a demographic of said attendees at said venue for the present time; and
      communicating said processed data to at least one of said venues, said members or said non-members;
   wherein said processed data comprises:
      (A) said real-time data correlated with trait information of said at least one member, said data processor comprising said trait information; or
      (B) said real-time data processed to at least a portion, or said real-time data of more than one member presently at said venue combined.

2. A system according to claim 1, wherein said demographic of attendees comprises a demographic of (a) only said members or (b) said members and said non-members combined.

3. A system according to claim 1, wherein a demographic of said members and said non-members combined is estimated from a demographic of said members presently at said venue.

4. A system according to claim 1, wherein said demographic of attendees comprises other than the number of people at said venue.

5. A system according to claim 4, wherein said demographic of attendees comprises the number or percentage (a) of one gender, (b) in predefined age ranges, (c) of an education level (d) of an occupation, (e) of a predefined marital status, (f) of a predefined parental status, (g) from a predefined zip code, (h) of a predefined political affiliation, (i) within predefined salary ranges, (j) liking a predefined genre of music, (k) liking a predefined performer, (l) liking a particular avocation, (m) having a particular sexual orientation, (n) being of a predefined race, (o) practicing a predefined religion or (p) who smoke.

6. A system according to claim 1, wherein said real-time data comprises said at least one member's estimate of the number of attendees, gender mix, attendee age or type of clientele.

7. A system according to claim 1, wherein said real-time data further comprises said at least one member's posting of at least one of the following real-time characteristics of said venue: type of music, genre of music, atmosphere, lighting, cover charge, attire, expensiveness, drinks and food available, drink specials, dancing, coat check, closing time, rating, comment, photo, audio clip and video clip.

8. A system according to claim 1, wherein said real-time data comprises said at least one member's real-time estimate of a demographic of attendees at said venue, said real-time estimate received in response to a prompt transmitted to said mobile communication device from said data processor, said prompt associated with said at least one member indicating said at least one member's presence in said venue.

9. A system according to claim 1, wherein said data processor processes time-stamped location information to provide behavior information or to predict whether a member is at a venue.

10. A system according to claim 1, said real-time data comprising location information, wherein said at least one member manually enters said location information into said mobile communication device.

11. A system according to claim 10, wherein said location information of said at least one member is provided to a second member.

12. A system according to claim 1, said data processor having location information, wherein said data processor receives said location information from a mobile communication device of a member who is not at a venue.

13. A system according to claim 1, wherein each of said venues is a bar, nightclub or lounge.

14. A system according to claim 1, wherein said real-time data comprises location information that is updated in real time or at predetermined times.

15. A system according to claim 1, wherein said mobile communication device of said at least one member has a position sensor for automatically determining the location of said at least one member.

16. A system according to claim 15, wherein said data processor automatically determines at which of said venues said at least one member is present using said location from said position sensor.

17. A system according to claim 15, wherein said position sensor comprises a global positioning system, an enhanced-observed-time-difference capability, a BlueTooth wireless system, a WiFi wireless system or pseudolites.

18. A system according to claim 1, wherein said data processor transmits member-intended information to a requesting member, said member-intended information based on any of the following being communicated to said data processor as desired or ranked by said requesting member: a demographic, a characteristic, closest venue to member's current location, most offers available, most members present, most male members present, most female members present, highest rating from other members, and best match to custom demographic.

19. A system according to claim 1, wherein said data processor transmits or receives SMS messages, MMS messages, video, audio or text.

20. A system according to claim 1, wherein member-intended information is transmitted to a mobile communication device of a member at other than said venue, said member-intended information comprising said demographic of attendees at said venue.

21. A system according to claim 1, wherein member-intended information is presented on a mobile communication device in the form of a map or text.

22. A system according to claim 1, wherein said data processor transmits trait information from said at least one member to a second member, said transmitted trait information being in the same categories of trait information received from said second member by said data processor.

23. A system according to claim 1, wherein said real-time data comprises location information of said at least one member, said at least one member's estimate of a demographic of attendees at said venue or characteristic information of said venue, or said data processor comprises trait information of said at least one member or behavior information of said at least one member.

24. A system according to claim 23, said data processor communicating said demographic of attendees, said trait information or said behavior information to a venue.

25. A system according to claim 23, said data processor communicating said demographic of attendees, said characteristic information, said trait information, or venue or sponsor promotional material to any of said members, wherein when said venue or sponsor promotional material is communicated, said data processor comprises said venue or sponsor promotional material.

26. A system according to claim 23, wherein said data processor comprises promotional material and selects mobile communication devices of members to which to transmit said promotional material based on (a) said demographic of attendees, (b) said characteristic information, (c) said trait information, (d) said behavior information, (e) instructions provided by a venue or (f) instructions provided by a sponsor.

27. A system according to claim 26, wherein said promotional material comprises drink specials, cover charge discounts, access to VIP lounges, transportation offers, parking specials, food specials, merchandise offers, lodging specials, music downloads, passes to events or retail gift cards.

28. A system according to claim 23, wherein said data processor comprises promotional material from a promoter having a communication device accessing an application provided by said organization for selecting mobile communication devices of members to which to transmit said promotional material based on (a) said demographic of attendees, (b) said characteristic information, (c) said trait information, (d) said behavior information or (e) instructions provided by said promoter.

29. A system according to claim 23, wherein said data processor comprises information of a reward and informs said at least one member of said reward receivable by said at least one member for (a) providing said trait information, (b) providing said behavior information, (c) providing said location information, (d) providing said demographic of attendees, (e) providing said characteristic information, (f) accepting a promoter's promotion, (g) recruiting new members or (h) having become a member of said organization.

30. A system according to claim 29, wherein said reward comprises promotional material, rewards points, cash, credit, a coupon, a discount or organization honors.

31. A system according to claim 30, wherein said promotional material comprises, or said rewards points are used to receive, drink specials, cover charge discounts, access to VIP lounges, transportation offers, parking specials, food specials, merchandise offers, lodging specials, music downloads, passes to events or retail gift cards.

32. A system according to claim 1, wherein said data processor comprises (a) a computer server or (b) a processor in said mobile communication device.

33. A system for providing a service to venues where people aggregate, said system comprising members associated with an organization for processing and transmitting information to said venues, said members or non-members, said members having mobile communication devices, said system comprising:
   a data processor, said data processor:
   receiving real-time data comprising information about attendees from a mobile communication device of at least one member presently at a venue;
   processing said real-time data to provide processed data comprising a demographic of said attendees at said venue for the present time; and
   communicating said processed data to a recipient being at least one of said venues, said members or said non-members;
   wherein said processed data comprises:
   (A) location information of said at least one member correlated with trait information of said at least one member, said data processor comprising said trait information, and said real-time data comprising said location information indicating said at least one member's presence in said venue for the present time provided by
      (1) a position-sensing device, or
      (2) said at least one member manually entering said location information into said mobile communication device; or
   (B) a posting processed to at least a portion based on said recipient's preferences or interests, importance, weighting factors, classification algorithms, said real-time data's quality, said real-time data's usefulness, or said real-time data compared to historical data, wherein said real-time data comprises said posting; or said real-time data of more than one member presently at said venue combined to determine or estimate said demographic of attendees.

34. A system according to claim 33, wherein said real-time data is received from mobile communication devices of at least two members presently at said venue.

35. A system according to claim 34, wherein said processing comprises determining, for members indicating their presence at said venue for the present time, the number of said indicating members, the percentage of said indicating members possessing a particular trait, or another statistic of the trait categories of said indicating members.

36. A system according to claim 34, wherein said demographic of attendees comprises other than the number of people at said venue.

37. A system according to claim 34, wherein said communicating is at the present time.

38. A system according to claim 34, wherein said data processor comprises (a) a computer server or (b) a processor in said mobile communication device.

39. A method for providing a service to venues where people aggregate, said method comprising members associated with an organization for processing and transmitting information to said venues, said members or non-members, said members having mobile communication devices, said method employing a data processor, said data processor:
  receiving real-time data comprising information about attendees from a mobile communication device of at least one member presently at a venue;
  processing said real-time data to provide processed data comprising a demographic of said attendees at said venue for the present time; and
  communicating said processed data to at least one of said venues, said members or said non-members;
  wherein said processed data comprises:
  (A) said real-time data correlated with trait information of said at least one member, said data processor comprising said trait information; or
  (B) said real-time data processed to at least a portion, or said real-time data of more than one member presently at said venue combined.

40. A system for providing a service to venues where people aggregate, said system comprising members associated with an organization for processing and transmitting information to said venues, said members or non-members, said members having mobile communication devices, said system comprising:
  a data processor, said data processor:
  receiving real-time data comprising information about attendees from a mobile communication device of at least one member presently at a venue;
  processing said real-time data to provide processed data comprising a demographic of said attendees at said venue for the present time; and
  communicating said processed data to a recipient being at least one of said venues, said members or said non-members;
  wherein said processed data comprises location information of said at least one member correlated with trait information of said at least one member, said data processor comprising said trait information, and said real-time data comprising said location information indicating said at least one member's presence in said venue for the present time provided by a position-sensing device.

41. A system according to claim 40, wherein said real-time data is received from mobile communication devices of at least two members presently at said venue, said mobile communication devices are mobile phones, said communicating is at the present time, and said demographic of attendees comprises other than the number of people at said venue.

42. A system for providing a service to venues where people aggregate, said system comprising members associated with an organization for processing and transmitting information to said venues, said members or non-members, said members having mobile communication devices, said system comprising:
  a data processor, said data processor:
  receiving real-time data comprising information about attendees from a mobile communication device of at least one member presently at a venue;
  processing said real-time data to provide processed data comprising a demographic of said attendees at said venue for the present time; and
  communicating said processed data to a recipient being at least one of said venues, said members or said non-members;
  wherein said processed data comprises location information of said at least one member correlated with trait information of said at least one member, said data processor comprising said trait information, and said real-time data comprising said location information indicating said at least one member's presence in said venue for the present time provided by said at least one member manually entering said location information into said mobile communication device.

43. A system according to claim 42, wherein said real-time data is received from mobile communication devices of at least two members presently at said venue, said mobile communication devices are mobile phones, said communicating is at the present time, and said demographic of attendees comprises other than the number of people at said venue.

44. A system for providing a service to venues where people aggregate, said system comprising members associated with an organization for processing and transmitting information to said venues, said members or non-members, said members having mobile communication devices, said system comprising:
  a data processor, said data processor:
  receiving real-time data comprising information about attendees from a mobile communication device of at least one member presently at a venue;
  processing said real-time data to provide processed data comprising a demographic of said attendees at said venue for the present time; and
  communicating said processed data to a recipient being at least one of said venues, said members or said non-members;
  wherein said processed data comprises a posting processed to at least a portion based on said recipient's preferences or interests, importance, weighting factors, classification algorithms, said real-time data's quality, said real-time data's usefulness, or said real-time data compared to historical data, wherein said real-time data comprises said posting.

45. A system according to claim 44, wherein said posting comprises said at least one member's real-time estimate of at least one demographic of attendees at said venue, said real-time estimate received in response to a prompt transmitted to said mobile communication device from said data processor, said prompt associated with said at least one member indicating said at least one member's presence in said venue.

46. A system according to claim 45, wherein a said posting is received from mobile communication devices of at least two members presently at said venue, said mobile communication devices are mobile phones, said communicating is at the present time, and said demographic of attendees comprises other than the number of people at said venue.

47. A system for providing a service to venues where people aggregate, said system comprising members associated with an organization for processing and transmitting information to said venues, said members or non-members, said members having mobile communication devices, said system comprising:
  a data processor, said data processor:
  receiving real-time data comprising information about attendees from a mobile communication device of at least one member presently at a venue;
  processing said real-time data to provide processed data comprising a demographic of said attendees at said venue for the present time; and
  communicating said processed data to a recipient being at least one of said venues, said members or said non-members;
  wherein said processed data comprises said real-time data of more than one member presently at said venue combined to determine or estimate said demographic of attendees.

48. A system according to claim 47, wherein said real-time data comprises said at least one member's real-time estimate of a demographic of attendees at said venue, said real-time estimate received in response to a prompt transmitted to said mobile communication device from said data processor, said prompt associated with said at least one member indicating said at least one member's presence in said venue.

49. A system according to claim 48, wherein said mobile communication devices are mobile phones, said communicating is at the present time, and said demographic of attendees comprises other than the number of people at said venue.

50. A system for providing a service to venues where people aggregate, said system comprising members associated with an organization for processing and transmitting information to said venues, said members or non-members, said members having mobile communication devices, said system comprising:

a data processor, said data processor comprising software capable of:

receiving real-time data comprising information about attendees or characteristics of a venue from a mobile communication device of at least one member presently at said venue;

correlating location information of said at least one member with trait information on said data processor of said at least one member to provide a demographic of attendees at said venue for the present time, said real-time data comprising said location information;

processing to at least a portion said real-time data comprising a posting of at least one demographic of attendees at said venue for the present time;

combining said real-time data of more than one member presently at said venue to determine or estimate a demographic of attendees at said venue for the present time;

communicating at the present time a demographic of attendees at said venue for the present time to at least one of said venues, said members or said non-members;

receiving and storing promotional material from a venue or sponsor; and communicating said promotional material to any of said members.

51. A system according to claim 50, wherein said software is capable of projecting the number of people that will attend said venue in the future.

* * * * *